(12) United States Patent
Perlman

(10) Patent No.: US 9,011,958 B2
(45) Date of Patent: *Apr. 21, 2015

(54) STABILIZATION OF OMEGA-3 FATTY ACIDS IN SATURATED FAT MICROPARTICLES HAVING LOW LINOLEIC ACID CONTENT

(71) Applicant: Perlman Consulting, LLC, Arlington, MA (US)

(72) Inventor: Daniel Perlman, Arlington, MA (US)

(73) Assignee: Perlman Consulting, LLC, Arlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/025,357

(22) Filed: Sep. 12, 2013

(65) Prior Publication Data

US 2014/0057039 A1    Feb. 27, 2014

Related U.S. Application Data

(63) Continuation of application No. 13/345,339, filed on Jan. 6, 2012, now Pat. No. 8,551,551.

(51) Int. Cl.

| | |
|---|---|
| A23C 9/00 | (2006.01) |
| A23C 9/152 | (2006.01) |
| A23G 9/32 | (2006.01) |
| A23L 1/24 | (2006.01) |
| A23L 1/30 | (2006.01) |
| A23C 9/13 | (2006.01) |
| A23C 13/16 | (2006.01) |
| A23C 15/12 | (2006.01) |
| A23L 1/32 | (2006.01) |
| A23C 17/00 | (2006.01) |
| A23C 19/093 | (2006.01) |
| A23G 9/40 | (2006.01) |
| A23D 7/00 | (2006.01) |

(52) U.S. Cl.
CPC .............. *A23C 9/1528* (2013.01); *A23G 9/32* (2013.01); *A23L 1/24* (2013.01); *A23L 1/3006* (2013.01); *A23C 9/1315* (2013.01); *A23C 13/16* (2013.01); *A23C 15/12* (2013.01); *A23L 1/3204* (2013.01); *A23C 17/00* (2013.01); *A23C 19/093* (2013.01); *A23L 1/3212* (2013.01); *A23L 1/3216* (2013.01); *A23G 9/327* (2013.01); *A23G 9/40* (2013.01); *A23L 1/3008* (2013.01); *A23D 7/003* (2013.01)

(58) Field of Classification Search
USPC ......... 426/564, 580, 581, 582, 583, 585, 601, 426/602, 605, 607, 613
See application file for complete search history.

(56) References Cited

U.S. PATENT DOCUMENTS

| | | |
|---|---|---|
| 4,165,405 A | 8/1979 | Login |
| 4,289,665 A | 9/1981 | Hudec |
| 4,670,285 A | 6/1987 | Clandinin |
| 4,752,416 A | 6/1988 | Scharf |
| 4,755,311 A | 7/1988 | Burjes |
| 4,895,725 A | 1/1990 | Kantor |
| 4,913,921 A | 4/1990 | Schroeder |
| 4,963,380 A | 10/1990 | Schroeder |
| 4,963,385 A | 10/1990 | Antrim |
| 5,023,101 A | 6/1991 | Sugihara |
| 5,084,294 A | 1/1992 | Schroeder |
| 5,258,197 A | 11/1993 | Wheeler |
| 5,354,485 A | 10/1994 | Tipton |
| 5,378,490 A | 1/1995 | Wheeler |
| 5,382,442 A | 1/1995 | Perlman |
| 5,407,695 A | 4/1995 | Wheeler |
| 5,411,756 A | 5/1995 | Wheeler |
| 5,427,790 A | 6/1995 | Frische |
| 5,456,939 A | 10/1995 | Wheeler |
| 5,464,548 A | 11/1995 | Cahoon |
| 5,484,542 A | 1/1996 | Cahoon |
| 5,514,407 A | 5/1996 | Perlman |
| 5,518,753 A | 5/1996 | Bracco |
| 5,552,174 A | 9/1996 | Wheeler |
| 5,554,306 A | 9/1996 | Segura |
| 5,565,232 A | 10/1996 | Wheeler |
| 5,578,334 A | 11/1996 | Sundram |
| 5,622,923 A | 4/1997 | Mathur |
| 5,624,703 A | 4/1997 | Perlman |
| 5,662,953 A | 9/1997 | Wheeler |
| 5,684,232 A | 11/1997 | Horn et al. |
| 5,686,131 A | 11/1997 | Sato |
| 5,698,498 A | 12/1997 | Luciani |
| 5,703,026 A | 12/1997 | Setser |

(Continued)

FOREIGN PATENT DOCUMENTS

WO          03056939         7/2003

OTHER PUBLICATIONS

Coupland, J. N., and McCiements, D. J., "Lipid Oxidation in Food Emulsions," Trends in Food Sci. & Tech., vol. 7, pp. 83-89 (1996).

(Continued)

*Primary Examiner* — Leslie Wong
(74) *Attorney, Agent, or Firm* — McLane, Graf, Raulerson & Middleton, PA

(57) ABSTRACT

An omega-3 fatty acid supplementation fat blend includes one part by weight of an omega-3 enriching oil containing EPA and/or DHA fatty acids that has been combined and diluted with at least one-half part by weight of a low linoleic acid content oxidatively stabilizing saturated fat. The omega-3 supplementation fat blend is incorporated into stabilized aqueous suspensions including beverages and foods.

34 Claims, No Drawings

(56) References Cited

U.S. PATENT DOCUMENTS

| | | |
|---|---|---|
| 5,709,888 A | 1/1998 | Gil et al. |
| 5,756,143 A | 5/1998 | Cain |
| 5,843,497 A | 12/1998 | Sundram |
| 5,874,117 A | 2/1999 | Sundram |
| 5,908,654 A | 6/1999 | Cain |
| 5,945,578 A | 8/1999 | Moore |
| 5,948,818 A | 9/1999 | Buser |
| 5,952,289 A | 9/1999 | Wise |
| 5,962,062 A | 10/1999 | Carrie et al. |
| 5,968,880 A | 10/1999 | Mathur |
| 5,998,081 A | 12/1999 | Morrisson |
| 6,025,008 A | 2/2000 | Akahoshi et al. |
| 6,034,130 A | 3/2000 | Wang |
| 6,121,472 A | 9/2000 | Knauft et al. |
| 6,159,523 A | 12/2000 | Cain |
| 6,184,009 B1 | 2/2001 | Cain |
| 6,214,405 B1 | 4/2001 | Horn |
| 6,261,732 B1 | 7/2001 | Morrisson |
| 6,297,279 B1 | 10/2001 | Wang |
| 6,410,078 B1 | 6/2002 | Cain |
| 6,428,461 B1 | 8/2002 | Marquez |
| 6,428,832 B2 | 8/2002 | van den Burg |
| 6,444,242 B1 | 9/2002 | Skelbaek |
| 6,447,833 B1 | 9/2002 | Widlak |
| 6,479,070 B1 | 11/2002 | Cain |
| 6,534,110 B1 | 3/2003 | Cain |
| 6,534,663 B1 | 3/2003 | Cain |
| 6,583,303 B1 | 6/2003 | DeBonte |
| 6,630,192 B2 | 10/2003 | Sundram |
| 7,041,324 B2 | 5/2006 | Myhre |
| 7,153,572 B2 | 12/2006 | Cooper |
| 7,229,653 B2 | 6/2007 | Sundram et al. |
| 7,344,747 B2 | 3/2008 | Perlman |
| 7,452,702 B2 | 11/2008 | Lee |
| 7,491,854 B2 | 2/2009 | Binder |
| 7,498,453 B2 | 3/2009 | Van Toor |
| 7,575,768 B2 | 8/2009 | Perlman |
| 2002/0058702 A1 | 5/2002 | Wang et al. |
| 2004/0131727 A1 | 7/2004 | Nakajima |
| 2005/0054724 A1 | 3/2005 | Mustad |
| 2005/0214409 A1 | 9/2005 | Tossavainen |
| 2005/0244564 A1 | 11/2005 | Perlman |
| 2006/0068076 A1 | 3/2006 | Bertholet et al. |
| 2011/0177224 A1 | 7/2011 | Perlman |
| 2011/0305811 A1 | 12/2011 | Perlman |

OTHER PUBLICATIONS

McCiements, D. J., and Decker, E. A., "Lipid Oxidation in Oil-in-Water Emulsions: Impact of Molecular Environment on Chemical Reactions in Heterogenous Food Systems," J. Food Sci. 65:1270-1282 (2000).
Chan et al., American J. of Clinical Nutrition, 53:1230 (1991).
Corbett, PBI Bulletin 1:1-4 (2002).
Ferretti et al., "Antithromboxane activity of dietary alpha-linolenic acid: a pilot study," Prostaglandins, Leukotrienes and Essential Fatty Acids, 54(6), p. 451 (1996).
Firestone, "Physical and Chemical Characteristics of Oils, Fats and Waxes," AOCS Press, Champaign, Ill, p. 31, 56, 88 & 89 (1999).
Firestone, "Physical and Chemical Characteristics of Oils, Fats and Waxes," AOCS Press, Champaign, Ill, p. 84-85 (1999).
Goodman et al., "Fat Soluble Vitamins," 8th ed. p. 1524 (1993).
Gunstone, "The Lipid Handbook, 2nd edition," Chapman & Hall, New York, p. 121 (1986).
Hoz, Meat Science, 65:1039 (2003).
Hui, "Baileys Industrial Oil and Fat Products," 5th edition, vol. 1, Wiley-Interscience Publication, New York, p. 39,444-445 (1996).
Ni et al., Journal of Food Science, 68(1), p. 345 (2003).
Santos et al., Food Chemistry, 88:123 (2004).
Weng et al., Appl. Spectrosc., 57(4), p. 413-418 (2003).

STABILIZATION OF OMEGA-3 FATTY ACIDS IN SATURATED FAT MICROPARTICLES HAVING LOW LINOLEIC ACID CONTENT

This application is a continuation of application Ser. No. 13/345,339, filed Jan. 6, 2012, now U.S. Pat. No. 8,551,551.

FIELD

Described herein are omega supplementation fat blends that comprise (a) one part by weight of a nutritionally beneficial omega-3 fatty acid-containing enriching oil, such as fish oil or algae oil that contains from about 10% to 60% by weight of DHA (docosahexaenoic acid) and/or EPA (eicosapentaenoic acid) and (b) at least one-half part by weight of an oxidative stabilization fat that contains a high level of saturated fatty acids, a low level of linoleic acid and, optionally, fat-soluble water-insoluble antioxidants. The supplementation fat blend is typically solid at food and beverage storage temperatures and exhibits excellent oxidative stability.

BACKGROUND

The following discussion is provided solely to assist the understanding of the reader, and does not constitute an admission that any of the information discussed or references cited constitute prior art.

Throughout the world, cow's milk has become a nearly universal part of the human diet, particularly for growing children and young adults. Milk provides high quality protein in the form of casein and whey, as well as minerals such as calcium, carbohydrate in the form of lactose, vitamins, and varying amounts of fat depending upon whether a consumer purchases full fat milk containing 4% milkfat, or alternatively reduced fat milk containing either 2% or 1% milkfat. For individuals who need to limit their intake of fat and cholesterol, non-fat or skim milk, which contains only a trace amount (less than 0.5%) of milkfat, aka butterfat, is available. Milk is used to produce a variety of other dairy food products including creams, a wide variety of cheeses including cottage cheese, as well as cultured yogurt, buttermilk, sour cream, ice cream, and many other dairy products. In addition to dairy products there are many other solid and liquid processed food products, such as hummus spreads, mayonnaise, frozen desserts, soy milk, oat and barley milks, vegetable and fruit juices, salad dressings, and condiments for example, that may be beneficially supplemented with omega-3 fatty acids found in certain triglyceride-based oils, such as fish oil, algae oil and flaxseed oil.

Milk Chemistry

Milk is an emulsion of butterfat globules within a water-based fluid. Each fat globule is surrounded by a membrane-like layer containing phospholipids and proteins. These membrane components keep the individual fat globules from joining together into larger particles of butterfat and also protect the globules from lipase enzymes found in the fluid portion of the milk. In non-homogenized cow's milk, the diameter of fat globules averages about four microns. The fat-soluble vitamins, A, D, E and K are found within the milkfat portion of the milk.

The most prevalent structures in the fluid portion of the milk are casein protein micellar aggregates whose structure also involves very small particles of calcium phosphate. Each micelle is roughly spherical and is about a tenth of a micrometer in diameter. There are four different types of casein proteins, and collectively they constitute approximately 80 percent (by weight) of the protein in milk. Most of the casein is bound in micelles. It is generally agreed that the outermost layer consists of strands of one type of protein, kappa-casein, extending out from the body of the micelle into the surrounding fluid. These molecules have a negative electrical charge and repel each other, keeping the micelles separated under normal conditions and in a stable colloidal suspension.

Both the fat globules and the smaller casein micelles, which are just large enough to deflect light, contribute to the opaque white color of milk. The native fat globules generally contain some yellow-orange carotene that may impart a creamy hue to a glass of milk. Fat-free skim milk on the other hand, contains only the smaller casein micelles to scatter light, and they tend to scatter shorter-wavelength blue light more than red, giving skim milk a bluish tint.

Milk contains dozens of other types of proteins besides the caseins. They are more water-soluble than the caseins and do not form actual structures in the milk. Because these proteins remain dispersed in the whey if casein proteins are induced to coagulate into curds, they are collectively known as whey proteins. Whey proteins including lactoglobulin, make up about twenty percent (by weight) of the protein in milk.

Upon standing for 12 to 24 hours, fresh milk has a tendency to separate into a high-fat cream layer on top of a larger, low-fat milk layer. The separation of the cream from the milk is usually accomplished rapidly in centrifugal cream separators. With non-homogenized milk, the fat globules rise to the top of a container of milk because fat is less dense than water. The larger the fat globules, the faster the cream separates.

With regard to homogenization, milk is homogenized to prevent the cream layer from separating out of the milk. The milk is typically pumped at high pressures through very narrow tubes, breaking up the fat globules through turbulence and high shear. As the fat globules are broken into many smaller particles (typically less than 1 micron in diameter) that possess more total surface area, the original fat globule membranes cannot re-form. The abundant small casein micelles are attracted to the newly-exposed surfaces of these smaller fat particles. Association with the casein micelles increases the density of the smaller fat globules and interferes with their clustering that would otherwise accelerate cream separation. Immediate pasteurization inactivates endogenous lipase enzymes that would otherwise attack the newly exposed surfaces of the smaller fat globules produced during homogenization. It is interesting to note that unlike pasteurization, homogenization confers no health or safety benefits to the milk. Its only contribution is the convenience of not needing to shake the bottle to distribute milkfat.

Omega-3 Fatty Acids.

Omega-3 fatty acids constitute a family of polyunsaturated fatty acids that are recognized as providing a wide range of health benefits when consumed as a regular part of the human diet. The most well known omega-3 fatty acids include alpha-linolenic acid (ALA), which is found in soybean oil, canola oil and flaxseed oil and docosahexaenoic acid (DHA), and eicosapentaenoic (EPA), which are commonly found in fish oil and algae oil. These fatty acids contain more than two carbon-carbon double bonds, including one double bond in the omega-3 or third position inward from the distal end of the fatty acid chain that is attached at its opposite end by an ester linkage to the glycerol backbone of the triglyceride molecule.

Although the human body is not capable of synthesizing omega-3 fatty acids from other nutrients, it is able to convert some of the dietary omega-3 alpha-linolenic acid that is 18 carbons in length with 3 carbon-carbon double bonds, to the longer 20 and 22 carbon chain EPA (20:5 n-3) and DHA (22:6 n-3) molecules. Both the omega-3 fatty acids and the omega-6 fatty acid, linoleic acid (18:2n-6), are termed "essential nutrients" because they are largely obtained from foods rather than synthesized by the body.

In recent years, the U.S. FDA has allowed a "qualified health claim" to be made with regard to the dietary consumption of EPA and DHA in conventional foods as well as dietary supplements. The claim states that "supportive but not conclusive research shows that consumption of EPA and DHA omega-3 fatty acids may reduce the risk of coronary heart disease."

A variety of medical conditions have been reported to be ameliorated by regular dietary consumption of EPA and DHA. The beneficial effects include improvement in blood circulation, control of heart arrhythmias, beneficial control of clot formation, reduction in blood pressure, beneficial reduction of blood triglyceride levels, reduced risk of primary and secondary heart attacks, and improvements covering a wide range of inflammatory diseases, including rheumatoid arthritis. Some research has suggested that fish oil may limit the risk of thrombotic and ischemic stroke as well, while beneficially reducing the amount of LDL cholesterol oxidation that occurs in the bloodstream and that may contribute to atherogenesis.

Some studies indicate that the incidence of certain forms of cancer including prostate, breast and colon is reduced by substantial dietary intake of omega-3 fatty acids. Still other research has suggested that omega-3 fatty acids may ameliorate conditions of psychological depression and anxiety.

Maximum safe levels of EPA and DHA have not been established, but it is believed that daily intake of 4 grams EPA and 2 grams DHA are not excessive. Many typical fish oils contain approximately 30% by weight EPA+DHA and, thus, it is likely that consuming up to 20 grams per day of fish oil would result in no adverse health effects. Many people consume between one and six 1 g capsules of fish oil per day, which provide from approximately 300-1800 mg of EPA and DHA. While these levels may be desirable goals for many health-conscious individuals, it is believed that consuming even a fraction of these levels will result in a significant public health benefit.

SUMMARY

Described herein are Omega Supplementation Fat Blends that comprise (a) an omega-3 fatty acid-containing enriching oil (referred to as an "Enriching Oil") that is nutritionally beneficial but may be undesirably susceptible to oxidation and development of off flavors and (b) at least an amount of "Oxidative Stabilization Fat" sufficient to substantially limit oxidation of the Entriching Oil. A wide variety of omega-3 Enriching Oils can be used, such as fish oils (e.g., menhaden oil, herring oil), anchovy oil, sardine oil or oils from non-animal sources of omega-3 fatty acids, such as algae oil. In various embodiments, such oils contain 25-30% by weight DHA and EPA fatty acids. These levels can be increased to greater than 30%, e.g., to 50-75% or higher (e.g., by interesterfying DHA and EPA fatty acids with fish oil or glycerol). In various embodiments, the Enriching Oil is a fish oil and/or an algae oil that contains the fatty acids DHA (docosahexaenoic acid) and/or EPA (eicosapentaenoic acid) and can rapidly develop off-flavors. Alternatively, an omega-3 Enriching Oil is obtained from a nonanimal (plant) source, such as soybeans (soybean oil), canola (canola oil) or flaxseed (flaxseed oil). In some embodiments, an Omega Supplementation Fat Blend comprises an Enriching Oil containing docosahexaenoic acid (DHA), eicosapentaenoic acid (EPA), alpha-linoleic acid (ALA); a combination of DHA and EPA; a combination of DHA and ALA; a combination of EPA and ALA; or a combination of DHA, EPA and ALA.

A wide range of ratios of Oxidative Stabilization Fat to Enriching Oil can be used, such as from 0.5:1 to 5:1 or 0.5:1 to 10:1 (Oxidative Stabilization Fat:Enriching Oil). In specific embodiments, 0.5:1, 1:1, 2:1, 3:1, 4:1 and 5:1 and any ratio within this range of Oxidative Stabilization Fat:Enriching Oil is used. A wide variety of types of Oxidative Stabilization Fat can be used, such as milkfat (including anhydrous milkfat, also known as anhydrous butterfat), palm oil (including palm olein, palm mid-fraction and palm stearin), palm kernel oil (including palm kernel stearin), coconut fat and combinations thereof. In one embodiment, the Oxidative Stabilization Fat is a saturated fat, such as milkfat or palm oil, that contains a high level of saturated fatty acids and a low level of linoleic acid. In a further embodiment, the Oxidative Stabilization Fat is a saturated fat, such as milkfat or palm oil that contains a high level of saturated fatty acids and a low level of linoleic acid and is supplemented with at least one (one or more) fat-soluble water-insoluble antioxidant. The use of a saturated fat (containing high levels of one or more of the fatty acids, lauric, myristic, palmitic and stearic acids) rather than a monounsaturated vegetable oil (that contains a high level of oleic acid), is counterintuitive from both a nutritional and physical perspective. That is, dietary intake of a saturated fats undesirably raises plasma LDL cholesterol levels, whereas intake of a oleic oil does not. Furthermore, a saturated fat may require heating to liquefy the fat for blending with an Enriching Oil while monounsaturated oils are liquid at room temperature. Surprisingly, however, small amounts of saturated fat have proven sufficient and effective for stabilizing omega-3 fatty acids without measurably raising plasma LDL cholesterol. The blend that results from combining an Enriching Oil and a small amount of saturated Oxidative Stabilization Fat is resistant to oxidation and off-favor development. Such a blend is more resistant than a homologous blend containing a stabilizing high oleic vegetable oil (e.g., see Perlman, U.S. application Ser. No. 12/276, 447 now abandoned). Since a relatively small amount of Oxidative Stabilization Fat is required to achieve oxidative stabilization when the Stabilization Fat is rich in saturated fatty acids, the nutritional effect of consuming this saturated fat is negligible. In one embodiment, a Supplementation Fat Blend that contains from about 50 mg to about 500 mg Oxidative Stabilization Fat per 100 mg fish oil is added to an 8 oz serving of milk.

An Oxidative Stabilization Fat is typically solid or semi-solid at room temperature and as such, typically solidifies an Enriching Oil under refrigerated conditions. The Oxidative Stabilization Fat: (i) contains 40%-95% by weight saturated fatty acids (of 100% total fat) by weight; (ii) contains less than 20%, and preferably less than 15%, 12%, 9%, 8% or less (e.g., 7%, 6%, 5%, 4%, 3% 2% or less than 2%) by weight linoleic acid; (iii) is solid at a refrigeration temperature of 4° C. and is usually solid or semi-solid at room temperature; and/or (iv) protects the Enriching Oil against off-flavor development or oxidation at or above the storage temperature of a beverage or food fortified with omega-3 fatty acids. In some embodiments, an Oxidative Stabilization Fat also contains at least one fat-soluble water-insoluble antioxidant, such as ascorbyl palmitate, rosemary oil, butylated hydroxyanisole (BHA) and butylated hydroxytoluene (BHT) or propyl gallate.

Applicant has previously described the use of a monounsaturated (high oleic acid) vegetable oil carrier vehicle for diluting and stabilizing fish oil prior to dispersal in milk. In U.S. application Ser. No. 12/276,447 Perlman suggested that oleic acid was preferred over saturated fatty acids in oxidative stabilization oils when both saturated and monounsaturated fatty acids are available (paragraph 28), and that the preferred ratio of monounsaturated to saturated fatty acids in the stabilization oil is between 1.5:1 to 10:1. Surprisingly however, new research (see below) shows that saturated fats may be substantially superior to high oleic oils for this purpose, and Applicant has determined that saturated fats/fatty acids are effective in stabilizing omega-3 fatty acids, including DHA and EPA, against oxidation. Saturated fats, such as anhydrous milkfat, may solidify over a moderately broad temperature range, e.g., between approximately 80-100° F. and, for example, in cold milk; a high oleic acid vegetable oil can remain liquid at these temperatures. An Omega Supplementation Fat Blend is more conveniently manipulated and dispersed at a temperature at which it has melted and is a liquid (e.g., at about 80-120° F.). As a liquid, the fat can be emulsified directly into a dairy product, such as milk or another aqueous beverage, or dispersed into a food product (in which solid fat microparticles would rapidly form if the temperature is below the melting point of the Omega Supplementation Fat Blend). Alternatively, the melted Omega Supplementation Fat Blend can be micro-dispersed to form a concentrated aqueous fat-in-water emulsion premix containing Omega Supplementation Fat Blend microparticles for later addition and dispersal in a beverage or food product.

Omega Supplementation Fat Blends can be dispersed into almost any water-containing commercial food or beverage product. Omega Supplementation Fat Blends are produced by diluting (combining), one part by weight of a triglyceride-based oil that is rich in omega-3 fatty acids (an "Enriching Oil") with at least one-half part by weight of an Oxidative Stabilization Fat that is melted, if necessary (when originally solid), to facilitate blending. When two fats are thoroughly combined/blended, the two fats dilute one another. For stabilization to occur, mixing must occur at the molecular level. The ratio of Oxidative Stabilization Fat to Enriching Oil ranges from approximately 0.5:1 to approximately 10:1 by weight. The Oxidative Stabilization Fat contains less than 20% by weight and preferably less than 15%, 12%, or 9%, 8% or less (e.g., 7%, 6%, 5%, 4%, 3%, 2% or less than 2%) by weight linoleic acid. For example, palm kernel stearin may contain less than 2% by weight linoleic acid. The Oxidative Stabilization Fat has a melting point or Mettler drop point that is preferably above room temperature. The Mettler drop point is defined as the temperature at which a solid fat becomes sufficiently fluid to flow under the force of gravity. This temperature is also referred to herein as the melting point. Typically, the Oxidative Stabilization Fat solidifies the Enriching Oil at the storage temperature of a beverage or food product that is being supplemented with omega-3 fatty acids. This is equivalent to stating that the Omega Stabilization Fat Blend is solid at the storage temperature, where, for a perishable beverage such as milk, the storage temperature is typically approximately 4° C.

In some embodiments, one or more fat-soluble/water-insoluble antioxidant(s), such as ascorbyl palmitate, rosemary oil, tocopherol, and/or BHA/BHT, are dissolved in the Omega Supplementation Fat Blend (or in its components) to further increase the oxidative stability of omega-3 fatty acids within the fat blend compared to the oxidative stability of the same blended omega-3 fatty acids without such antioxidants.

DETAILED DESCRIPTION

When melted, the Omega Supplementation Fat Blend can be emulsified or otherwise micro-dispersed into an aqueous beverage or food to become fatty microparticles. Alternatively, the Omega Supplementation Fat Blend can be micro-dispersed in an aqueous medium to form an emulsion concentrate (thereby providing a food additive ingredient) for later addition to a beverage or food.

The Enriching Oil component of the stabilized Omega Supplementation Fat Blend contains from about 10% to about 60% by weight omega-3 fatty acids and, in certain embodiments, from about 20% to about 60% by weight or more omega-3 fatty acids. For example, one Enriching Oil used herein is a menhaden-derived fish oil prepared by OmegaProtein, Inc. (Houston, Tex.). It has a melting point of approximately 13° C. and contains approximately 25-35% by weight omega-3 fatty acids (32% typical value); EPA and DHA account for approximately 14% and 9% by weight of omega-3 fatty acids, respectively. While not intending to limit the useful range of compositions, the ratio (by weight) of Oxidative Stabilization Fat to Enriching Oil typically ranges from about 0.5:1 to about 10:1, and in specific embodiments, the ratio is between about 0.5:1 and about 5:1 or between about 1:1 and about 5:1. Two different Oxidative Stabilization Fats that have been extensively tested are palm fat and anhydrous milk-fat. When melted by heating, Omega Supplementation Fat Blends produced using either milkfat or palm fat combined with fish oil are easily dispersed, emulsified, suspended or otherwise dispersed into a beverage or food product. Upon dispersal into a cold beverage/food, or shortly thereafter, the Omega Supplementation Fat Blend is cooled, typically to a temperature below the solidification temperature of the Blend. To achieve maximum oxidative stabilization or resistance to off-flavor development, it is desirable that the dispersed Omega Supplementation Fat Blend microparticles remain solid at the storage temperature of the supplemented food or beverage. The process of emulsification, dispersing or suspending and the resulting emulsion, dispersion or suspension are meant to encompass all means of homogeneously and stably dispersing small particles of an Omega Supplementation Fat Blend throughout a beverage or food. Technically, an emulsion is a mixture of two or more liquids which are normally immiscible, in which both the dispersed and the continuous phase are liquid. In an emulsion, one liquid (the dispersed phase) is dispersed in the other (the continuous phase). In the present instance, an initially melted Omega Supplementation Fat Blend may be emulsified into a cold beverage, such as cold milk, in which the microparticles of liquified fat solidify to form a dispersion or stable suspension of fat in the beverage (e.g., in milk).

Dispersions of Omega Supplementation Fat Blends in beverages and foods. Producing dispersions of stabilized Omega Supplementation Fat Blends in beverages and foods may be accomplished by at least two different methods. These include: Method 1: For batch processing, a pre-measured amount of a prepared Omega Supplementation Fat Blend may be dispersed directly into a beverage or food. If a prepared emulsion (e.g., a pre-made emulsion) is added and dispersed into a food or beverage product instead, it is typically pre-stabilized by addition of an emulsifier, such as at least one milk protein, soy protein, lecithin, modified lecithin or mono- and diglyceride. Method 2: As an alternative, for continuous processing of a fluid product, a metered flow can be utilized in which a stream of melted Omega Supplementation Fat Blend is kept warm enough to be a melted liquid until it gets dispersed/emulsified in the cold milk. Omega Supplementation Fat Blend may be added, shear-blended, spray-injected or otherwise dispersed directly into a food or beverage (rather than adding and dispersing an emulsion). For example, an Omega Supplementation Fat Blend can be formed continuously from two metered streams comprising or consisting essentially of: (i) an omega-3 Enriching Oil and (ii) a melted Oxidative Stabilization Fat, such as anhydrous milkfat (AMF). As these two streams are merged and blended to form a melted Omega Supplementation Fat Blend, the blend may be dispersed as described above into a beverage or food product, or alternatively into only a limited portion of the product, to produce a concentrate. This concentrate can be fed into a milk reservoir (or other beverage or food product) and further blended, homogenized and/or pasteurized as appropriate. The finished beverage or food product is generally maintained at a temperature below the melting point of the Omega Supplementation Fat Blend, thereby stabilizing the Omega Supplementation Fat Blend as solid microparticles that are able to remain stably dispersed in a food or beverage such as cow's milk, soymilk, or fruit and vegetable beverages.

Method 1, as described above, was used to disperse oxidatively stabilized fish oil and prepare batches of non-fat cow's milk (34 pounds milk providing 68 half pint/8 ounce servings) containing menhaden fish oil (100 mg per 8 oz milk serving). Fish oil (100 mg) containing the antioxidant mixture described in Example 5 was diluted with either 500 mg high oleic sunflower oil (HOSO) or 300 mg AMF, and the resulting combination was dispersed in the milk. The fish oil (6.8 g diluted with either 34 g HOSO or 20.4 g AMF) was initially shear-blended at high speed and dispersed in approximately 1 pound of milk for 2 minutes before low speed blending with the remainder of the milk for 5 minutes. Milks were homogenized and UHT-pasteurized (2000 psi, 281° F. for 3 min) before being filled into 250 ml capacity sterile clear plastic bottles and refrigerated. Some bottles were wrapped in foil and stored refrigerated in the dark, and other identical but unwrapped bottles were placed in a refrigerator alongside cool white fluorescent lights and rotated regularly to assure uniform exposure to light. Taste evaluation was conducted at approximately 2 day intervals, and new bottles were opened each time for each evaluation. No off-flavors were detected through day 5 for milks carrying either the HOSO or the AFM-diluted fish oils stabilized with the same amounts of antioxidant agents. However, on day 7, tastings of each of these milks revealed initial development of off-flavor notes. It can be concluded that under these specific conditions of fluorescent light stress and constant amount of antioxidant, addition of 3 parts AMF per 1 part fish oil may provide a degree of milk flavor stability that is similar to that provided by addition of 5 parts HOSO per 1 part fish oil.

With dark storage of the milks, rather than with fluorescent lighting at 4° C., off-flavors developed more slowly. Thus, for fish oil diluted with 5 parts HOSO, off flavors were detected on day 14 or day 17 (the latter when antioxidant level was doubled). By comparison, when the same fish oil was diluted with only 3 parts by weight AMF (and identically dispersed in non-fat milk and again stored in the dark at 4° C.), off flavors were not detected until day 19. Thus, unexpectedly, significantly smaller amounts of AMF than HOSO (3 parts versus 5 parts) were able to stabilize the fish oil for a longer period of time.

The Oxidative Stabilization Fat is typically a saturated vegetable or animal fat or combination thereof (such as palm fat, palm kernel fat or anhydrous milkfat) containing a low level of endogenous 18:2 linoleic acid (less than 15% and preferably less than 12%, 9% or even 5% by weight). Minimizing the level of linoleic acid is desirable in some embodiments because Applicant has shown that linoleic acid can be a pro-oxidant when combined with omega-3 fatty acids. Conversely, to the extent that more highly polyunsaturated omega-3 fatty acids, especially those found in fish oil or algae oil (DHA and EPA), have been diluted with a saturated Oxidative Stabilization Fat carrier, (thereby forming an Omega Supplementation Fat Blend), the rate of oxidation and off-flavor development can be substantially reduced. Therefore, the Omega Supplementation Fat Blend is designed and formulated to contain both very low levels of 18:2 and relatively high levels of saturated fatty acids. To provide additional oxidative stability, the Omega Supplementation Fat Blend may also include fat-soluble antioxidants such as ascorbyl palmitate, vitamin E, and/or rosemary extract.

Dispersal of microscopic particles of the stabilized Omega Supplementation Fat Blend (2 parts milkfat and 1 part fish oil) in nonfat milk, and subsequent flavor and mouth feel analysis by a tasting panel has shown that the resulting milk is indistinguishable from regular nonfat milk. The Omega Supplementation Fat Blend stabilization system assures that the oxidative degradation and rancidity development of DHA and EPA can be delayed or prevented.

Subsequent dispersal of microscopic particles of the stabilized Omega Supplementation Fat Blend (solid at the storage temperature of the beverage or food) provides beneficially neutral mouthfeel and neutral flavor. Examples of Omega Supplementation Fat Blend-supplemented beverages and foods include milk, fruit juices, vegetable juices, and foods such as yogurt, salad dressings, spreads and cheeses. The Omega Supplementation Fat Blend stabilization system assures that the oxidative degradation and rancidity development of DHA and EPA can be delayed or prevented.

Applicant has previously described substantial oxidative stabilization of DHA and EPA achieved by dilution of an Enriching Oil into certain triglyceride-based, highly monounsaturated liquid oils such as high oleic acid sunflower oil that contain limited amounts of linoleic acid (e.g., containing only 6-8% linoleic acid). See, for example, co-pending U.S. application Ser. No. 12/276,447 by Perlman filed Nov. 24, 2008 now abandoned and U.S. application Ser. No. 12/143,729, filed Jun. 20, 2008 now abandoned also by Perlman. Notwithstanding that earlier work with liquid oils, as Applicant explains here, Oxidative Stabilization Fats can now be selected that are saturated fats and that feature both low levels of linoleic acid (to control the rate of free radical oxidation) and a sufficiently elevated melting temperature. The term "sufficiently elevated" means that when the Oxidative Stabilization Fat is melted and blended with an Enriching Oil, the resulting Omega Supplementation Fat Blends remain solid at, and preferably above, the storage temperature of the beverage or food product. For example, in the case of refrigerated cow's milk with a storage temperature of approximately 4° C., Omega Supplementation Fat Blends that are solid can be easily produced using milkfat, coconut fat, palm oil, palm olein, palm stearin, palm kernel oil, palm kernel olein and palm kernel stearin, for example. Applicant has previously shown that oxidative degradation of Enriching Oils can be reduced by combining some or all of the following physical and chemical conditions with a food or beverage: (a) adding fat-soluble/water-insoluble antioxidant agents including sacrificial chemical antioxidants such as ascorbyl palmitate and rosemary oil, (b) reducing light exposure and thus photo-oxidation, (c) reducing the storage temperature, and (d) diluting omega-3 containing Enriching Oils with far less oxidatively reactive oils such as high oleic/low linoleic acid sunflower oil.

As described herein, omega-3 oxidative stability can be increased relative to that previously achieved by Applicant using high oleic sunflower oil by one or more of the following conditions:

(i) substituting saturated fatty acids for monounsaturated, e.g., oleic acid (and any remaining polyunsaturated linoleic acid) in the Oxidative Stabilization Fat, and (ii) substantially reducing the diffusive movement of omega-3 fatty acids within an Enriching Oil or within an Omega Supplementation Fat Blend.

The latter is accomplished by altering the physical state of the Enriching Oil from a liquid to a solid within an Omega Supplementation Fat Blend or within microparticles formed from such a Fat Blend. More specifically, a diluent fat (Oxidative Stabilization Fat) is selected with a melting point that is above 4° C., and may also be above room temperature. Such a fat must contain at least 40% by weight saturated fatty acids and a low level of linoleic acid (less than 15% by weight, and preferably less that 8% or even 5%), to obtain the benefits of an unreactive or very slowly reactive oil or fat.

Accordingly, in the Examples described below, fat-in-water emulsions were produced that contained fish oil pre-diluted into different stabilization fats prior to emulsification and subsequent dilution into skim milk. It will be seen that the choice of stabilization oil or fat, the extent of dilution of the fish oil into the stabilization oil, and the presence of antioxidant can all affect omega-3 flavor stability and oxidative stability in non-fat cow's milk. Omega-3 flavor stability has been measured by sensory/taste testing evaluation, and oxidative stability determined by instrumental analysis of oxidative stability index (OSI) value. A striking increase in stability can be achieved when an Oxidative Stabilization Fat (anhydrous milkfat or palm oil) is one in which the oil or the fat contains less than approximately 10% linoleic acid.

It has been found that dietary consumption of omega-3 fatty acids is desirable in order to provide certain health benefits. Advantageously, such omega-3 fatty acids can be provided in common beverages and foods consumed on a daily basis such as cow's milk, soy milk, fruit and vegetable juices, and other food products that include at least a small quantity of oil or fat, e.g., 0.5 g-1 g of oil or fat per standard serving of the beverage or food product. In the present instance, the fat may be conveniently added in the form of a fat-in-water emulsion (or other suspension or dispersion of fatty microdroplets in a generally aqueous food environment). There is a broad opportunity for using this means of delivering omega-3 fatty acids in common dietary foods and beverages. Prior to developing the present technology, omega-3 supplementation in food and beverage products such as milk was problematic because omega-3 fatty acids are relatively unstable, so that fishy and other off-flavors can easily develop during the requisite shelf life, i.e., before the product's expiration date. This flavor problem is particularly acute for low fat and non-fat milks. If fish oil and other sources of omega-3 fatty acids (herein collectively termed "Enriching Oils") can be formulated such that their resistance to oxidative rancidity development is significantly increased, then the ability to supplement a wide variety of foods and beverages can also be substantially increased.

Described herein is a method that overcomes oxidative stability issues that have been previously encountered when a food or beverage, e.g., non-fat or low fat milk, has been supplemented using oil-in-water (o/w) emulsions or dispersions of fish oil (or other omega-3 fatty acid enriching oils). Omega Supplementation Fat Blend compositions and methods described herein employ a limited amount of saturated fat that is low in linoleic acid to dilute, solidify and thereby stabilize a small amount of Enriching Oil that typically contains DHA and/or EPA fatty acids. The oxidation rate of omega-3 fatty acids diluted and converted from a liquid state to a solid state by addition of a saturated fat is reduced sufficiently to provide a significantly increased shelf life. Diluting the Enriching Oil into an Oxidative Stabilization Fat is done prior to blending (e.g., homogenizing) the fat into milk or other food product or product component. By contrast, separately added and homogenized Enriching Oil and Oxidative Stabilization Fat would have little chance of combining (as separate milk protein-coated microparticles) to promote oxidative stabilization.

While the Omega Supplementation Fat Blend described herein typically contains only natural oils and fats, the combining of highly saturated fats and highly polyunsaturated Enriching Oils is counterintuitive. Highly saturated fats such as milkfat and palm kernel oil have been historically considered unhealthy whereas DHA and EPA are considered among the healthiest of all the fats and oils. Surprisingly, however, the oxidative stability of a solid saturated fat carrier such as milkfat, which is low in linoleic acid, can beneficially offset and limit the oxidation of omega-3 fatty acids. Furthermore, the amount of saturated fat needed for combining with and stabilizing an Enriching Oil in a food or beverage product can be small, e.g., from about 0.5 g to about 1 g per serving. Taking advantage of the proven oxidative stability of Omega Stabilization Fat Blends, Applicant believed that concentrated oil-in-water emulsions might be successfully prepared by emulsifying and dispersing high levels (e.g., 10%-40% by weight) of Omega Supplementation Fat Blends. Such aqueous emulsions could be usefully diluted into water-containing beverage and food products.

In one embodiment, an Omega Supplementation Fat Blend contains docosahexaenoic acid (DHA) and/or eicosapentaenoic (EPA) fatty acids present at a combined level that is sufficient to provide at least 10 mg of DHA plus EPA per 8 ounces of an aqueous beverage or food composition. In other embodiments, the Omega Supplementation Fat Blend contains one part by weight of an Enriching Oil which contains DHA and/or EPA fatty acids that have been combined and diluted with at least one-half part by weight of an Oxidative Stabilization Fat.

In particular embodiments, the rate of oxidation of the DHA and EPA fatty acids is reduced to less than 0.80, 0.70, 0.50, 0.30, 0.20, 0.10, 0.05, 0.02, 0.01, or 0.005 of the rate of oxidation of an equal quantity of the EPA/DHA fatty acid-containing enriching oil homogenized or otherwise blended in droplet (preferably microdroplet) form into the aqueous suspension (e.g., cow's milk) without having been first combined and diluted with the oxidative stabilization fat, or reduced to within a range which is defined by taking any two different just specified values as the endpoints of the range; the rate of oxidation of the EPA/DHA fatty acids added per normal serving (e.g., 8 ounce serving of the milk) via the supplementation oil is reduced between 2- and 400-fold, 2 and 100-fold, 4- and 400-fold, 4- and 200-fold, 4- and 100-fold, 4- and 50-fold, b- and 400-fold, 6- and 200-fold, 6- and 100-fold, 6- and 50-fold, 10- and 400-fold, 10- and 200-fold, 10- and 100-fold, 10- and 50-fold, 50- and 400-fold, or 100- and 400-fold, or even more compared to the rate of oxidation of the same quantity of the EPA/DHA fatty acid-containing enriching oil homogenized into the aqueous suspension without having been first combined and diluted with the oxidative stabilization fat.

In certain embodiments, the oxidative stabilization fat contains no more than 20, 15, 12, 11, 10, 9, or 8% by weight of polyunsaturated fatty acids, or specifically of linoleic acid; the oxidative stabilization fat contains at least 60, 65, 70, 75, 80, or 85% of monounsaturated fatty acids and/or saturated fatty acids; the oxidative stabilization fat contains at least 60, 65, 70, 75, 80, or 85% of oleic acid; the oxidative stabilization fat contains no more than 20, 15, 12, 11, 10, 9, or 8% by weight of polyunsaturated fatty acids, or specifically of linoleic acid and at least about 40, 45, 50, 55, 60, 65, 70, 75, 80, or 85% of saturated fatty acids; the oxidative stabilization fat is a low linoleic acid content fat (commonly a vegetable fat or milkfat), e.g., a low linoleic acid and high lauric and/or myristic and/or palmitic and/or stearic acid-containing oxidative stabilization fat; palm fat, coconut fat, cocoa butter, palm oil, palm olein, palm kernel oil, milkfat, and/or animal fat; the oxidative stabilization fat contains no more than 10, 9, 8, 7, 6, 5, 4, 3, 2, or 1% by weight ALA and/or no more than 2, 1.5, 1, 0.7, 0.5, 0.2, or 0.1% EPA+DHA; the oxidative stabilization fat satisfies the ALA and/or EPA+DHA levels just specified and also satisfies any of the limitations specified for an oxidative stabilization fat as specified in this paragraph or otherwise specified herein.

Also in certain embodiments, the EPA/DHA fatty acid-containing enriching oil includes at least 15, 20, 25, 30, 35, 40, 45, 50, 55, or 60% (or even higher) by weight of the long chain polyunsaturated fatty acids EPA, DHA, and combinations thereof, or contains EPA, DHA, or a combination thereof in a range of between 15 and 60%, 20 and 60%, 25 and 60%, 30 and 60%, or 40 and 60%; the EPA/DHA fatty acid-containing enriching oil is or includes fish oil; the EPA/DHA fatty acid-containing enriching oil is or includes algae oil; the structural isomeric arrangement of EPA and/or DHA fatty acids contained within the triglyceride molecules of said EPA/DHA fatty acid-containing enriching oil have not been altered from their native structural arrangement; the EPA and/or DHA fatty acids contained within the triglyceride molecules of said EPA/DHA fatty acid-containing enriching oil have been interesterified, and the average number of said EPA and/or DHA fatty acids per triglyceride molecule has been increased.

In particular embodiments, one part by weight of an EPA/DHA fatty acid-containing enriching oil has been combined and diluted with approximately 0.5, 1.0, 1.5, 2, 3, 4, 5, 7, 10, 12, 15, 17, or 20 parts by weight of an oxidative stabilization fat, e.g. a low linoleic acid/high saturated fatty acid-containing oxidative stabilization fat, or with between 0.5 and 1 part, 1 and 2 parts, 2 and 5 parts, 2 and 10 parts, 2 and 20 parts, 5 and 10 parts, 5 and 20 parts, 10 and 15 parts or 10 and 20 parts by weight of an oxidative stabilization fat.

For some embodiments, between 5 and 500 mg, 10 and 200 mg, 10 and 100 mg, 50 and 500 mg, 50 and 200 mg, 50 and 100 mg, 100 and 500 mg, or 100 and 200 mg of EPA fatty acid or DHA fatty acid or a combination of both are added per 8 ounce serving of the milk.

In certain embodiments in which there are separate oil and water phases (e.g., as an emulsion) in the composition (e.g., a milk or milk-containing product), the oil phase includes at least one oil soluble and water-insoluble antioxidant, highly preferably at a concentration effective to provide significant antioxidant protection to unsaturated fatty acids (and especially to polyunsaturated fatty acids, including omega-3 fatty acids) in that oil phase. Such antioxidants may, for example, include BHA, BHT or a combination of both BHA and BHT, and/or propyl gallate (e.g., at levels not to exceed 200 ppm by weight, singly or in combination) and/or ascorbyl palmitate (also referred to as vitamin C palmitate, e.g., at levels of up 1000 ppm by weight).

Thus, in particular embodiments, the oil phase includes 10 to 100, 20 to 100, or 50 to 100 ppm of BHA and/or BHT, and/or 20 to 1000, 50 to 1000, 100 to 1000, 50 to 500, 100 to 500, 200 to 700, or 200 to 500 ppm ascorbyl palmitate. The oil phase includes effective amounts of at least two, three, or four different approved oil soluble/water-insoluble antioxidants; the oil phase includes at least a 3, 4, 5, 7, 10, 15, or 20-fold dilution of an omega-3 fatty acid enriching oil in an oxidative stabilization oil and at least one oil soluble/water-insoluble antioxidant, preferably effective to reduce the oxidation rate of polyunsaturated fatty acids to no more than 0.9 (90%), 0.8, 0.7, 0.5, 0.3, 0.2, or 0.1 (10%) of the rate in the absence of the antioxidant(s); the oil phase includes vitamin E (e.g., at a level of 200 to 2000 ppm by weight or even higher) and at least one other oil soluble/water-insoluble antioxidant, e.g., an antioxidant(s) as described for other embodiments herein.

In further embodiments, the composition is or includes cow's milk, which can, for example, be skim milk (non-fat milk), 1% reduced fat milk, 2% reduced fat milk, or whole milk; the cow's milk or the composition is incorporated into another cow's milk-containing dairy product, e.g., hard cheese, cottage cheese, cream cheese, yogurt, fresh cream, sour cream, buttermilk, ice cream, a mixed dairy beverage, or butter.

In particular embodiments, the supplementation oil is a single oil or an oil blend which contains EPA and/or DHA at levels such that the combination of the two is no more than 30% by weight of that oil, and preferably no more than about 25, 20, 17, 15, 12, 10, 8, 7, 6, or 5% by weight of the supplementation oil and/or the supplementation oil contains ALA, preferably at a level of no more than about 30% by weight, or more preferably at a level of no more than about 25, 20, 15, or 10% by weight; such supplementation oil may, for example be a blend of an omega-3 fatty acid-enriching oil and an oxidative stabilization fat and optional oxidative stabilization oil, a blend of two or more fats and oils of which none by itself is an oxidative stabilization fat or oil, or a single oil selected or designed to provide the desired omega-3 fatty acid levels. In particular embodiments, the levels of other polyunsaturated fatty acids or specifically of linoleic acid in the supplementation oil is limited, e.g., such that the non-omega-3 polyunsaturated fatty acids or specifically linoleic acid constitute no more than about 20, 15, 12, 11, 10, 9, 8, 7, 6, 5, or 4% by weight of the supplementation oil, and/or the supplementation oil contains at least about 30, 40, 50, 60, 65, 70, 75, 80, or 85% by weight of a saturated fatty acid or combination of saturated fatty acids or at least about 30, 40, 50, 60, 65, 70, 75, 80, or 85% by weight of a combination of lauric, myristic palmitic and stearic saturated fatty acids or combination of saturated fatty acids and from about 3 to about 25, from about 5 to about 25, from about 10 to about 25, from about 3 to from about 15, from about 3 to from about 10, from about 5 to from about 15, or from about 5 to from about 10% by weight of monounsaturated fatty acids (preferably where the saturated fatty acid to monounsaturated fatty acid ratio is at least 1.5, 2, 3, 5, 7 or 10 to 1.

In particular embodiments, the product is a milk, milk-containing or milk-derived composition, a cream, cream-containing, or cream-derived composition, a cream cheese, a processed cheese, a natural cheese, a sour cream, a yogurt, a coffee creamer, an ice cream, a refrigerated or non-refrigerated dip, a salad dressing (including both spoonable and pourable salad dressings), a mayonnaise, a popcorn shortening, a "smoothie" beverage, or a processed egg or egg substitute.

Similarly, in a related aspect, the technology concerns a food or beverage composition suitable for human consumption that includes an aqueous suspension (e.g., cow's milk) that has been supplemented and blended (e.g., homogenized) with an omega-3 fatty acid-containing supplementation fat, where the supplementation fat includes one part by weight of an alpha-linolenic fatty acid-containing enriching oil, that has been combined and diluted with at least one part by weight of an oxidative stabilization fat.

In particular embodiments, the reduction of the rate of oxidation, the type and/or amount of oxidative stabilization fat, the ratio of the enriching oil and the stabilization fat, the type of milk and/or composition are as described for embodiments of the preceding aspect.

In certain embodiments, the alpha-linolenic fatty acid-containing enriching oil is flaxseed oil.

A related aspect concerns a blended omega-3 fatty acid-containing supplementation oil, which includes an omega-3 fatty acid-rich oil artificially blended as an artificial mixture with an oxidative stabilization fat, e.g., in a ratio of 1 part omega-3-rich oil and at least one-half part of the oxidative stabilization fat.

In particular embodiments, the omega-3 fatty acid-containing supplementation oil, the omega-3-containing oil (i.e., omega-3 rich oil), and the oxidative stabilization fat are as specified for other aspects herein.

Additional related aspects concern a method for making a blended omega-3 fatty acid-containing supplementation oil and a method for making a stabilized, omega-3 supplemented aqueous suspension (e.g., liquid milk). The method for making a blended omega-3 fatty acid-containing supplementation oil involves artificially blending one part by weight of an enriching oil containing at least one omega-3 fatty acid, e.g., docosahexaenoic acid (DHA) or eicosapentaenoic (EPA) fatty acids or both, and/or alpha linolenic acid (ALA) with at least one part by weight of an oxidative stabilization fat, thereby forming an omega-3 fatty acid-containing supplementation oil. The method for making a stabilized, omega-3 supplemented aqueous suspension (e.g., liquid milk) involves blending (e.g., homogenizing) a quantity of an omega-3 fatty acid-containing supplementation oil (e.g., as prepared by the preceding method) with an aqueous suspension such as cow's milk (commonly a skim milk), thereby forming a stabilized, omega-3 supplemented aqueous suspension (e.g., liquid milk), usually containing from about 0.05% to about 7% by weight of fats and oils.

In particular embodiments, the resulting milk or other aqueous suspension, the enriching oil, and/or the oxidative stabilization fat are as described for an omega-3 supplemented aqueous suspension (e.g., liquid milk) for other aspects herein.

Additional embodiments will be apparent from the Detailed Description and from the claims.

DETAILED DESCRIPTION

In recent years, the medical community has become increasingly aware of the importance of consuming omega-3 fatty acids as a regular part of the human diet. The addition of fish oil, algae oil, and/or flaxseed oil as Enriching Oils to cow's milk and other edible aqueous suspensions can help ensure that young people in particular will regularly consume omega-3 fatty acids. However, a difficulty with such additions has been that the fish oils or other omega-3 fatty acid-containing oils can relatively rapidly develop a disagreeably fishy odor/flavor due to degradation products. This problem is particularly difficult in products such as skim milk and 1% milk products, but can also occur with 2% and whole milk and other food products containing higher levels of fats and oils. In the skim and 1% milks, the omega-3 fatty acids appear to be especially exposed to oxidation, with the result that off-flavors develop excessively rapidly.

Described herein is the stabilization of omega-3 fatty acids in aqueous suspensions, such as skim milk, 1% milk, 2% milk and whole milk, as well as in other foods containing such milks or other aqueous suspensions. The compositions and methods involved in adding omega-3 fatty acids to aqueous suspensions such as milk are optimized, so that the chemical stability of omega-3 fatty acids is maintained. This helps ensure that the flavor of the enriched food product will not be unacceptably compromised by oxidation of omega-3 fatty acids.

Because milk is a component of the diet of many individuals, and because rapid rancidity of milks supplemented with omega-3 fatty acid is readily detectable and highly objectionable to most individuals, the compositions and methods will primarily be described and illustrated in the context of milk products. However, it should be understood that they can be used with essentially any oil:water suspension (which is often emulsified).

Production of Omega-3 Supplemented Milks

Current production of homogenized milk involves several manufacturing steps that are relevant to the process of supplementing milk with Enriching Oils, including flaxseed oil and/or fish oil, which are the current principal sources of omega-3 fatty acids. Whole milk arriving from a dairy farm is normally processed through a cream separator that produces separate streams of skim milk and cream. By this means, any source of cow's milk can be processed using a single protocol that provides skim milk that is subsequently modified by adding varying amounts of milkfat, minerals, e.g., added calcium, fortifying vitamins, optional milk solids, flavorings, e.g., chocolate, and the like.

In a simple milk production operation, skim milk, vitamins A and D, and appropriate amounts of cream are metered into a mixing tank. Alternatively, fish oil may also be metered (often separately) into the mixing tank along with the milk. After thorough mixing, the blended milk is sent through a homogenizer and pasteurizer that emulsify the fat into very small, stable fat globules or microdroplets in the milk as described above. The milk is also heated to a sufficient temperature and for a sufficient time to kill most of the microorganisms in the milk. With so-called UHT pasteurization, the milk is rendered essentially sterile for extended shelf life, allowing the milk to be stored for some time without refrigeration, or under refrigerated conditions with a shelf life of several weeks following production.

Omega-3-Associated Off-Flavors in Milk

As indicated above, in response to the growing awareness that omega-3 fatty acids can provide substantial health benefits to humans of all ages, a number of dairies have begun to supplement conventional cow's milk products with flaxseed oil, providing alpha-linolenic acid (ALA) and/or fish oil (providing EPA and DHA). It has been observed that off-flavor development in such omega-3-supplemented milks can occur, and sometimes (e.g., during the summer season) it is a regular problem during the shipping and storage of these milks. Off-flavor development has been characterized as a somewhat "fishy" flavor, or other unexpected flavor. Such off-flavors are reported more frequently with skim milk and 1% milks than with higher milkfat-content products.

Indeed, the oxidative stability problem of fish oil in milk has been recognized for years, and only limited progress has been made in solving this essential problem that involves complex chemistry.

It is believed that the amount of fishy flavor development that occurs in fish oil-supplemented milks depends upon shipping and storage temperatures and the time spent in the grocery cooler prior to purchase and dietary consumption. Some of these variables are difficult to control. It appears that off-flavor development associated with fish oil and other omega-3 source enrichments is most pronounced in skim milk, less pronounced in reduced fat milk, and least problematic in full fat milk. It would be highly desirable to modify some aspect of the chemistry of omega-3 supplemented milk, or modify the physical or chemical environment within the milk storage container to prevent off-flavor development associated with omega-3 supplementation.

Another variable involves the amount of fish oil being added to an 8 ounce serving of milk. One typical level employed is approximately 100 mg of fish oil per 250 gm serving of milk which provides a total of approximately 32 mg of EPA plus DHA.

Solution for Omega-3-Associated Off-Flavor Development in Milk

Cow's milk, which is an important exemplary aqueous emulsion, typically contains less than 4% edible fat. The principal milk products are non-fat milk (less than 0.2% milkfat), reduced fat milks (approximately 1% and 2%), and whole milk (approximately 3.5-4.0%). These milks, and especially the non-fat milk and 1% reduced fat milk, present the difficult problem posed by omega-3 supplementation because of the degradative reactions of omega-3 fatty acids.

As a remedy for the above problem, and instead of adding the individual fat components to milk and co-homogenizing (adding the omega-3-enriching fish oil and milkfat/cream separately to milk), Applicant first pre-dissolved the unstable omega-3-fatty acid-containing fish oil in a fat believed to provide oxidative stabilization prior to homogenization. The presumptive stabilization fat is a triglyceride-based carrier material such as an oxidation-resistant vegetable or animal fat or oil such as palm oil, palm kernel oil or milkfat. In that manner, small microglobules (aka microparticles) of fat formed in the milk during homogenization would contain omega-3 fatty acids already diluted with a fat resistant to oxidative rancidity. The triglyceride-based carrier fat or oil used is substantially more resistant to oxidation than the omega-3 fatty acid-containing oil. In some embodiments, the carrier (that acts as a chemical diluent for the omega-3 fatty acid enriching oil, e.g., fish oil) is a fat high in saturated and/or monounsaturated fatty acids and low in polyunsaturated fatty acids (e.g., no more than about 20% and preferably no more than about 10% polyunsaturated fatty acids). In particular embodiments, the carrier fat or oil is low in linoleic acid and, in further embodiments the carrier fat is a highly saturated, low-linoleic fat or a high oleic acid content vegetable oil. Carrier fats include the palm oil and fractions derived therefrom, palm kernel oil and fractions derived therefrom, coconut oils and milkfats. One example of a carrier oil that is not highly saturated, but may be combined with a highly saturated carrier fat, is high oleic acid content/low linoleic acid sunflower oil (e.g., Clear Valley Sunflower Oil or Odyssey 100 Sunflower Oil sold by Cargill, Inc. (Minneapolis, Minn.) containing 10% saturated fatty acids, 82% by weight monounsaturated oleic acid and only 8% linoleic acid. A variety of different fats, oils and fat-oil blends, which have substantially greater oxidative stability as compared to omega-3 fatty acid-containing oils, may be used.

As explained above, in one embodiment one part by weight of an omega-3-enriching fish oil (e.g., EPA/DHA enriching oil) is pre-dissolved with at least one-half part by weight of an oxidative stabilization fat such as milkfat to dilute by at least one-third the omega-3 fatty acids relative to their original concentration in the enriching oil. This dilution of the omega-3 fatty acids, accompanied by conversion from their original liquid state to a solid state, can substantially reduce the rate of omega-3 oxidation. Of course, greater dilutions can be used, with corresponding lower levels of omega-3 fatty acid oxidation expected.

Therefore, to provide a 3-fold dilution, if 100 mg of fish oil is to be added as a supplement to a serving of milk, it can first be diluted with at least 200 mg of oxidative stabilization fat, such as the milkfat described above. Greater or lesser dilutions of the omega-3-enriching oil can be used with, for example, 50-500 mg milkfat being used as the oxidative stabilization fat for 100 mg of fish oil to provide a 33% to 600% dilution.

The resulting mixture or blend of Enriching Oil and omega-3 stabilization fat (i.e., an oxidative stabilization fat) that is added and homogenized in cow's milk or other aqueous suspension may be conveniently referred to as an "omega-3 fatty acid-containing supplementation fat or oil", or simply as a "supplementation fat or oil", or with added reference to the based aqueous suspension, e.g., a "milk supplementation fat or oil."

In further embodiments, other fats and/or oils may be used as oxidative stabilization fats and/or oils, e.g., milkfat, cocoa butter, conventional palm oil, palm mid-fraction, palm olein, palm superolein, and palm kernel oil, in which these fats and oils and their derivatives are low in linoleic acid (e.g., about 2-11%) and high in saturated fatty acids. Conventional canola oil, soybean oil, cottonseed oil, corn oil, sunflower oil, milk fat, and/or safflower oil, as well as combinations of such oils, may also be used in combination with the above oxidative stabilization fats and/or oils.

In forming the blend of Enriching Oil and omega-3 oxidative stabilization fat, in many cases, a single stabilization fat will be used. However, as indicated above, more than one fat and/or oil may be used in combination as an oxidative stabilization fat. Such a combination will often be formed by mixing more than one fat or oil to form the oxidative stabilization fat, before blending with the Enriching Oil. However, the blend may also be formed by combining more than one fat, which together act as an oxidative stabilization fat, with the Enriching Oil without premixing or with only partial premixing of the components of the oxidative stabilization fat. In many embodiments, the various fat components of the oxidative stabilization fat will each be oxidative stabilization fats, but alternatively, one or more of those component fats will not be oxidative stabilization fats alone, but the combination is an oxidative stabilization fat.

Inclusion of Antioxidants in Oil Phase of Dairy Products

As an approach to enhance the oxidative stabilization effects of dilution of omega-3 fatty acid-containing oils by dilution in an oxidative stabilization fat, or as an alternative to that approach, fat/oil-soluble, water-insoluble antioxidants can be included in the dairy products, and especially in aqueous emulsion type products such as liquid milks. In this approach, at least one antioxidant is blended with an omega-3 fatty acid-containing edible oil, or with an oxidative stabilization oil which is simultaneously or subsequently mixed with an omega-3 fatty acid-containing enriching oil.

Using antioxidants to protect omega-3 fatty acids and other polyunsaturated fatty acids against oxidation in milks and similar products involves selection of appropriate antioxidants. The antioxidants should be fat/oil-soluble, water-insoluble antioxidants, or antioxidants which can be used at sufficiently high concentrations and having sufficiently low solubility in water that the residual antioxidant concentration in the oil phase of the milk is still sufficiently high to provide effective antioxidant protection. A number of antioxidant compounds are commonly used in foods. These include, for example, TBHQ, BHA, and BHT.

Tert-butylhydroquinone (TBHQ), also identified as 2-(1,1-Dimethylethyl)-1,4-benzenediol, is used as a food preservative, including as an antioxidant in edible oils. It is currently regarded as the most effective antioxidant for such oils and is stated to be effective in foods (e.g., fried foods) prepared using such oils. Nonetheless, TBHQ is less desirable for use as an antioxidant in the present milks and similar products because it has appreciable water solubility. As a result, even if initially present in the oil phase of the emulsion, it will rapidly partition between the oil and aqueous phases. Due to the much greater volume of the aqueous phase as compared to the oil phase in milks and similar aqueous suspensions, a substantial fraction or even most of the TBHQ will partition in to the aqueous phase and will not be effective to protect the omega-3 fatty acids (or other polyunsaturated fatty acids) from oxidation.

On the other hand, BHA (butylated hydroxyanisole) and BHT (butylated hydroxytoluene) have sufficiently sparing solubility in water that only a small amount of these compounds will partition from the oil phase to the water phase in milk. As a result, inclusion of one or both of these compounds in an oil preparation as indicated above, which is then mixed and homogenized with a milk or other aqueous phase, will provide effective oxidation protection.

Vitamin E (e.g., as D-alpha-tocopherol or D,L-alpha tocopherol) can also be added, and can serve as an antioxidant for the oils in a milk product, or other oil:water suspension. Vitamin E can also be added to milk as a dietary supplement (most often in the form of D- or D,L-alpha-tocopheryl acetate), e.g., at levels of about 0.01 to 0.02% by weight of the milk or other aqueous suspension. For use as an antioxidant for the oil in milk or other such aqueous suspension, an active form (e.g., free tocopherol) is added to the oil, in many cases at a level of about 100 to 5000 ppm or more commonly about 200 to 2000 ppm in the oil, e.g., about 200 to 500, 300 to 700, 500 to 1000, 700 to 1500, or 1000 to 2000 ppm. Other isomers of tocopherol can also be used as alternatives or in addition, such as beta-tocopherol, gamma-tocopherol, delta-tocopherol, and combinations thereof.

Additional Approach for Providing Stabilized Omega-3 Fatty Acids in Milk

As described above, work described herein is concerned with providing milk products and other food products containing oil:water suspensions supplemented with omega-3 fatty acids (e.g., from fish oils or flaxseed oil) in a manner such that oxidation of the omega-3 fatty acids is significantly reduced. As described above, this can advantageously be accomplished by blending an omega-3 fatty acid-enriching oil with an Oxidative Stabilization Fat, e.g., a saturated fat containing a limited amount of linoleic acid, thereby providing oxidative stabilization. The discovery that such blending is effective also leads to the approach of focusing on the final fatty acid composition of the Omega Supplementation Fat Blend. Thus, the Omega Supplementation Fat Blend may be formed by blending an omega-3 fatty acid-rich oil with a solid saturated fat. Alternatively, the Omega Supplementation Fat Blend may be formed by blending more than one oil and/or fat, to produce a fat that is solid at the storage temperature of the food or beverage and has the desired balance of omega-3 fatty acids and fatty acids that resist oxidation such as monounsaturated and saturated fatty acids, and without an excess of linoleic acid (less than 12% by weight). In still another alternative, a single oil may be selected or genetically engineered to have an acceptable balance of fatty acids, such as a selected or engineered algal oil.

DEFINITIONS

To assist the understanding of the reader, the following terms and phrases are applicable and have the indicated meanings.

The term "food or beverage composition" refers to any edible solid, semi-solid, semi-liquid or liquid composition, and includes aqueous emulsions (e.g., cow's milk) and suspensions in any measurable amount.

The term "aqueous suspension" refers to a suspension of one or more species in water. Such species may include, for example, proteins and/or oils. In many but not all cases, such an "aqueous suspension" will be an "emulsion". The term "stabilized omega-3 aqueous suspension" refers to an aqueous medium (such as skim milk) to which an omega-3 supplementation oil has been added or into which an omega-3 supplementation oil has been emulsified (e.g., to produce a homogenized filled milk). A filled milk or other filled dairy product is a non-fat milk or other non-fat dairy product that has been reconstituted with fats from sources other than dairy cows.

The terms "blend," "blending" or "blended," "mixed," mixing, or "mixture" and similar terms relating to combining fats and/or oils indicate that the triglyceride molecules in the mixture have been co-mingled at the molecular level so that the beneficial results of diluting one oil (e.g., an enriching oil that is susceptible to oxidation) with another oil or fat (e.g., an oxidative stabilization fat that is more resistant to oxidation) are obtained.

The term "supplemented and homogenized" refers to the addition to any aqueous suspension, e.g., cow's milk, with high shear mixing or other effective blending method, by which an edible oil (or traditionally cream) is uniformly and stably dispersed into the milk so that the edible oil (in the form of micro-droplets) does not substantially separate from the bulk of the aqueous suspension and float to the top. Such separation would be undesirable in the same manner that cream separation that occurs in non-homogenized cow's milk is undesirable. Generally there will be no substantial separation over the normal shelf life for the resulting product.

The terms "Enriching Oil," "EPA/DHA Enriching Oil" and "EPA/DHA fatty acid-containing oil" refer to any edible oil that is a predominantly triglyceride-based oil and contains a high level of the omega-3 fatty acids, EPA and/or DHA. The term "high level" as used herein means that the edible oil contains at least a total of 10% by weight EPA+DHA fatty acids, and preferably 20-35% or even 35-60%, or higher EPA+DHA fatty acids.

The terms "alpha-linolenic fatty acid-containing enriching oil" and "alpha-linolenic acid-containing oil" refer to any edible oil that is predominantly triglyceride-based and contains a high level of the omega-3 fatty acid, alpha-linolenic acid (abbreviated ALA). The term "high level" with regard to ALA content means that the edible oil contains at least 20% by weight ALA and preferably 35% by weight or more ALA.

Further distinguishing the present omega-3 ALA fatty acid-containing supplementation fats or oils from conventional cooking and salad oils is that a substantial proportion of the ALA-containing triglyceride molecules in the ALA Enriching Oils contain two, and sometimes three, omega-3 ALA fatty acids esterified within the same triglyceride molecule. Thus, for the three glycerol carbon positions within omega-3-containing triglyceride molecules found in the supplementation oils, often the sn-1 and sn-2, or the sn-2 and sn-3, or the sn-1 and sn-3 positions are esterified with omega-3 ALA fatty acids.

The term Omega Supplementation Fat Blend "omega-3 fatty acid-containing supplementation fat or oil", "supplementation fat or oil", and like terms such as those containing reference to an aqueous suspension or oil-water suspension (e.g., "omega-3 fatty acid-containing milk supplementation oil") are used to refer to an edible oil composition that includes omega-3 fatty acids provided in an Enriching Oil that has been blended and thereby chemically diluted with an Oxidative Stabilization Fat in proportions such that the rate of oxidation of the omega-3 fatty acids is significantly reduced as compared to the rate of oxidation of the omega-3 fatty acids in a conventional fish oil (e.g., menhaden oil or sardine oil) that contains at least 30% by weight of a combination EPA and DHA. Such oxidation rate is determined for oils (or oil-containing milk product) held at 4 degrees C. with air exposure of at least 50 cm$^2$ per liter. The significant reduction is a statistically significant reduction, preferably such that the rate of oxidation in the supplementation oil is not more than 0.80, 0.70, 0.50, 0.30, 0.20, 0.10, 0.05, 0.02, 0.01, or 0.005 of the rate in the fish oil. In various embodiments, the supplementation oil is a blended oil composition, such as a mixture of edible oils, that includes:

(a) an omega-3 fatty acid-containing enriching oil (providing EPA and/or DHA and/or ALA, see above) that is susceptible to oxidation and, that is combined and diluted with (b) a triglyceride-based edible fat or oil that possesses good oxidative stability compared to the oxidative stability of oils high in omega-3 fatty acids. Preferably such fat or oil is low in polyunsaturated fatty acids (especially linoleic acid) and high in saturated fatty acids. Edible fats and oils having good oxidative stability can be referred to as "oxidative stabilization fats and oils", such as palm oils, palm kernel oils, coconut oil and milkfat.

The term "oxidative stabilization fat" refers to a triglyceride-based edible fat that is substantially more resistant to oxidation than EPA/DHA fatty acid-containing enriching oils. In some embodiments, such oxidative stabilization fat contains less than about 20% and in other embodiments contains less than about 17% 15%, 12%, 11%, 10%, 9%, or 8% by weight polyunsaturated fatty acids and more specifically, less than about 20%, 17%, 15%, 12%, 11%, 10%, 9% or 8% by weight, linoleic acid. Preferably such oxidative stabilization fat also contains more than about 50% and preferably more than about 55%, 60%, 70%, 75%, or 80% by weight of saturated fatty acids. In desirable embodiments, the oxidative stabilization fat is milkfat, palm oil or palm kernel oil. These may be optionally combined with high oleic oxidative stabilization oils. Thus for example. high oleic sunflower oil sold as Clear Valley® High Oleic Sunflower Oil or Odyssey® 100 High Stability Sunflower Oil produced by Cargill, Inc. (Minneapolis, Minn.) contains only 8% linoleic acid, 8% palmitic+stearic saturated fatty acids, and 82% monounsaturated oleic acid. Advantageously, oxidative stabilization oils preferably contain no more than 15% by weight linolenic acid (generally as ALA) and more preferably no more than about 12, 11, 10, 9, 8, 7, 6, 5, 4, 3, 2, or 1% by weight, and/or no more than about 2% EPA+DHA, and more preferably no more than about 1.5, 1, 0.7, 0.5, 0.2, or 0.1%.

As shown herein, the oxidative stabilization fat or oil is effective in stabilizing omega-3 fatty acids in the omega-3 supplementation oil. The rate of oxidation of at least 10 mg of EPA and DHA fatty acids added to an 8 ounce serving of milk is reduced at least two-fold, compared to the rate of oxidation of an equal amount of the same EPA and DHA fatty acid-containing enriching oil that is homogenized into the same cow's milk without having been first combined and diluted with the oxidative stabilization fat or oil.

The terms "whole milk," "reduced fat milk" and "skim milk" have their standard meanings, with whole milk containing approximately 4% milkfat; reduced fat milks containing either approximately 2% or 1% by weight milkfat, and skim milk containing from no added milkfat up to about 0.5 g fat per 8 oz. serving (0.2% by weight fat).

The term "fish oil" is discussed elsewhere herein. Fish oil is refined from the tissues of many varieties of oily fish such as mackerel, sardines and herring. Fish oil commonly contains between 20% and 30% by weight of a combination of EPA and DHA long chain polyunsaturated fatty acids. The fish do not actually produce omega-3 fatty acids, but instead accumulate them by consuming microalgae (also termed "algae" herein) that produce these fatty acids or other organisms which have accumulated those fatty acids. Marine microalgae, or phytoplankton, provide the food base for the entire sea animal population. The best known microalgae are the diatoms, dinoflagellates, green algae and blue-green algae. These microalgae species produce a wide range of lipid fatty acids including significant quantities of the essential polyunsaturated fatty acids, linoleic acid, alpha-linolenic acid and the highly polyunsaturated omega-3 fatty acids, octadecatetraenoic acid (C18:4), eicosapentaenoic acid (C20:5) and docosahexaenoic acid (C22:6).

The term "algae oil" refers to an oil obtained from lipid-producing microorganisms, including for example, diatoms, dinoflagellates, green algae, and/or blue-green algae. Commonly such algae oil is obtained from green algae.

The term "interesterified" used in the context of an EPA and DHA fatty acid enriching oil refers to the optional use of enzymatic or chemical cleavage of these fatty acids from the natural triglyceride molecule, followed by esterification, by which the average number of EPA and/or DHA fatty acids esterified (attached by an ester linkage) per fat molecule may be increased. Fish oils so altered by interesterification may contain upward of about 50% by weight EPA/DHA.

The term "high oleic oils" as used herein refers to edible oils containing at least about 65% and preferably at least about 70%, 75%, or 80% by weight of the monounsaturated fatty acid, oleic acid. Plant breeding has allowed the genetic selection of a variety of high oleic vegetable oil species including but not limited to sunflower oil, safflower oil, canola oil, and soybean oil.

The term "rate of oxidation" in the context of oxidation of EPA and DHA fatty acids within an edible oil that is added to cow's milk according to the methods described herein, refers to the rate of accumulation of by-products from fatty acid oxidation including acids, aldehydes, and ketones, for example. These by-products are produced by peroxidation or addition of oxygen atoms to the fatty acids contained within fish oil triglyceride molecules. The accumulation of such oxidative by-products may be measured by a variety of methods known to those skilled in the art, including, for example, organoleptic evaluation methods by which rancidity in a milk sample becomes detectable by taste and/or smell and chemical, as well as chemical analytical methods.

As used herein in connection with edible oils, the term "artificial mixture" refers to a mixture or blend created by combining two or more oils that are from different sources and have different characteristics. Similarly, the terms "artificially blending" and "artificially mixing" refer to a blending carried out by a person or persons.

In reference to inclusion of antioxidant compounds to oils and especially to the use of such oils in milks, milk-containing products, and other aqueous suspensions and foods containing such aqueous suspensions, the term "effective amount" or an indication that the antioxidant(s) are "effective" means that the antioxidant(s) significantly reduce the rate of oxidation of polyunsaturated fatty acids or particularly of omega-3 fatty acids in the oil as compared to the rate of oxidation with conditions, under the same except that the antioxidant(s) are not used. In some cases the rate of oxidation is reduced to no more than about 95, 93, 90, 80, 70, 60, 50, 40, 30, 20, or 10% of the oxidation rate in the absence of the antioxidant(s).

In connection with the use of antioxidants, the term "fat-soluble/water-insoluble" means that the particular antioxidant compound has a vegetable oil/water partition coefficient at 4° C. (based on an approximately average canola oil) of at least about 20, but preferably at least about 25, 50, 100, 200, 300, 500, 700, or 1000. In this context, the partition coefficient is the ratio of the concentration of the solute in the vegetable oil to the concentration of the solute in the water at equilibrium ($C_o/C_w$)

Also in the context of the use of antioxidants, the term "fat soluble" indicates that the antioxidant is sufficiently soluble in a present supplementation oil at 4 degrees C. to effectively reduce the rate of oxidation of polyunsaturated fatty acids in that oil, and/or to have a solubility in average canola oil at 4 degrees C. of at least 50 ppm, and preferably at least 100 ppm by weight. In some cases, the solubility will be greater, e.g., at least about 200, 500, 700 or 1000 ppm.

In reference to a particular type of vegetable oil, the particular fatty acid composition and content of the oil is based on a large number of independent geographically and temporally diverse samples of the specified oil that have been analyzed for fatty acid composition and averaged.

In reference to food products, the term "normal serving" refers to the quantity of that food product which matches FDA requirements for serving size definitions for nutritional labeling purposes, e.g., based on FDA-established lists of "Reference Amounts Customarily Consumed Per Eating Occasion." For example, a normal serving of milk or yogurt is 8 ounces or 1 cup. If the serving size is not defined by such FDA requirements, then the serving size is the amount of that food customarily eaten at one time based on consumer data. In reference to an edible aqueous suspension which is not itself the food product in question, unless indicated to the contrary in the context of a particular food product which incorporates the aqueous suspension the term "normal serving" refers to the quantity of the aqueous suspension incorporated in a "normal serving" of that food product.

Further embodiments are provided below.

EXAMPLES

Example 1

Example of Stabilized Omega-3 Supplemented Milk

Preparation Method for Pilot Production Tests with Fish Oil-Supplemented Milk

Standardized milks, i.e., milks adjusted to the standards of identity for skim, 1% or 2% reduced fat milks, or whole milk respectively were prepared, adding non-fat milk solids (adding either non-fat condensed milk or non-fat powdered milk) and cream if required for adjusting fat content. Typical non-fat condensed milk contained approximately 33% non-fat milk solids. Standardized milks containing the required butterfat and non-fat milk solids content were added into a 1200 gallon tank with a wide sweep agitator.

Separate from the milk, one part by weight of fish oil (e.g., menhaden oil) containing approximately 32% by weight total omega-3 fatty acids) was mixed and diluted with two parts by weight of an Oxidative Stabilization Fat, i.e., anhydrous milkfat, containing approximately 65% saturated fatty acids, 31% monounsaturated fatty acids and 4% polyunsaturated fatty acids.

Approximately 250 gallons of the standardized milk was transferred to a high speed blender. With the agitator running in the blender, half the oil mixture was added to the blender. Vitamins (vitamin A palmitate, vitamin D3 and D,L-alpha-tocopheryl acetate) required for the batch along with any other required ingredients (e.g., sugar, cocoa, carageenan, vanilla and salt for chocolate milk) were added to the blender, and the blender was allowed to run an additional 15 seconds. This operation was repeated for the remainder of the batch, and the blended product was returned to the 1200 gallon tank and allowed to recirculate for one minute. The finished 1200 gallon batch was transferred to a raw holding tank and the next batch commenced. Generally, four or more 1200 gallon milk batches were prepared and transferred to the raw holding tank before homogenization and ultra-pasteurization were carried out.

Milk Stability Tests

Stability Problem. Nutritionally enhanced varieties of milk were prepared containing increased levels of calcium and protein (via added milk solids) as well as fortifying levels of vitamin E and omega-3 fatty acid-rich fish oil. Such enhanced milk products were subjected to ultra-pasteurization with the expectation of providing milks having a code life (saleable shelf life) of 77 days.

Initial commercial milk formulations were manufactured with 4.3 pounds of cod liver fish oil being homogenized per 10,000 pounds of milk. This milk contained 0.043% fish oil that provided approximately 32 mg of EPA plus DHA per 8 oz serving of milk and was returned by consumers complaining about fishy flavor as soon as 45 days following manufacture. These complaints were more common with skim milk products as compared to the 1% reduced fat milk and full fat milk. More generally, complaints of fishy flavor were reported within one to two months following manufacture. This was deemed unsatisfactory since the expiration code required that these milks maintain satisfactory taste for at least 77 days (2.5 months) following manufacture.

Modifications to the milk that is most susceptible to off-flavor development (the skim milk formula and lactose-reduced skim milk) were initiated with the hope of improving the robustness of the formula against rancidity, to allow the product to reliably last the entire coded period under normal storage and usage conditions without consumer complaints.

Use of Fish Oil Dilution. As described elsewhere herein, Applicant discovered that the resistance of fish oil to becoming rancid in milk, and the resulting increase in the shelf life of fish oil-fortified milk products might be accomplished by pre-combining and diluting the fish oil into a rancidity-resistant vegetable oil such as a high oleic acid content vegetable oil. Because milk production trials are very expensive and wasteful, two stability tests were adopted.

0.2% by weight (0.48 g per serving) of a high oleic content vegetable oil (sunflower oil containing 82% oleic acid, 8% linoleic acid and 8% saturated fatty acids) was pre-combined with 0.043% by weight of fish oil (0.103 g per serving) thereby diluting the fish oil 5.7-fold before adding into regular skim milk. As an experimental control, a skim milk formulation containing the same type and amount of fish oil (0.043% cod liver oil containing approximately 31% by weight EPA+DHA and providing about 32 mg EPA+DHA per serving) but lacking the high oleic content vegetable oil was also produced. Bottled milk samples were held at refrigerated temperature (3° C.) to assess normal refrigerated shelf life during the marked code life of the milk.

The refrigerated control skim milk (with undiluted fish oil) showed flavor degradation within 45 days; the skim milk with pre-diluted fish oil showed no flavor degradation even after 80 days at 3 degrees C. Products were also evaluated for taste after these refrigerated milks were diluted ten-fold into hot water at 90° C. to reflect the effect of hot tea or coffee on the milk. Similar results were obtained, and confirmed the efficacy of pre-diluting a fish oil into a stabilizing oil or fat before homogenizing with milk.

Samples of the above skim milk products were also held at elevated temperature (30° C.) for accelerated stability testing, and sampled daily for off-flavor development. Skim milk that contained the undiluted fish oil (without any high oleic content sunflower stabilizer oil for diluting the fish oil) showed rapid flavor degradation during incubation at 30° C., turning fishy and rancid within 3 to 4 days. By contrast, the same skim milk containing the sunflower oil-diluted fish oil showed no flavor degradation before 11 days of incubation at 30° C. In addition, similarly incubated 1% milkfat-containing regular and lactose-free milks containing the same amount of diluted fish oil (0.043% fish oil and 0.2% high oleic sunflower oil) showed no flavor degradation even after 12 days of incubation.

Second, multi-variant trials were initiated on a Microthermics, pilot size milk processor to evaluate a number of possible changes in the milk formulation. A variety of milk samples stored in both sealed as well as open bottles (milk exposed to air) were evaluated daily for flavor deviation at elevated temperature (30° C.). All milks contained the above-described 0.1 g per serving of fish oil diluted with 0.5 g per serving of high oleic content vegetable oil. Control samples were run along with the test samples.

Results Summary. The milk production samples evaluated to date showed the following results:

Skim milk samples were produced containing the same above-described fish oil diluted with the same amount of high oleic sunflower oil as described above. From three different production runs, the milk (stored at 30° C. for accelerated stability testing) lasted at least 10.5, 12, and 12 days before either showing rancidity or exhausting the samples available for tasting (see table below). From previous tests it was known that skim milks without pre-dilution of the fish oil lasted only 3-4 days at 30° C. before tasting fishy. This represents a three to four-fold improvement in resistance to rancidity development as a function of time, owing to the pre-dilution of the fish oil with the stabilizing sunflower oil.

Lactose-Free skim milk samples containing fish oil and oxidative stabilization oil from one production run were similarly prepared and evaluated for 12.5 days at elevated temperature with no flavor deviation noted (all samples evaluated).

Milks containing 1% butterfat from two production runs were similarly prepared and evaluated during 10 and 12 days storage at elevated temperature (30° C.) with no rancidity deviation noted in any of the samples tasted (all samples evaluated).

Evaluation of identical refrigerated samples (3° C.) showed that all products lasted over 60 days with no rancidity noted.

| Product | Code | Days to Fail at 30 degrees C. | Days to Fail at 3 degrees C. |
| --- | --- | --- | --- |
| Skim | May 19 | 11 | >70 |
| Skim | May 19 | >10* | >70 |
| 1% | May 20 | >10* | >70 |
| Lactose Free | May 28 | >12.5* | >70 |
| Skim | May 28 | >12* | >70 |
| 1% | May 29 | >12* | >70 |

*exhausted sample before rancidity failure

Skim milks with 0.1 g/serving undiluted fish oil showed rancidity before 5 days at 30 degrees C.

Pilot samples are run using the same production settings as used with full scale production. Further experiments are being conducted to optimize the dilution ratio of high oleic content vegetable oil to fish oil in order to determine the minimum effective ratio for achieving flavor stability at 3° C. over further extended time intervals beyond 60 days, e.g., 80-100 days. For example, ratios in excess of 4:1 dilutions, e.g., 5:1, 7:1 and 10:1 are being tested. In addition, edible oils other than high oleic vegetable oil are being tested such as palm oil, palm olein, palm stearin, palm kernel oil, milkfat, cocoa butter, corn oil, canola oil, safflower oil, sunflower oil, cottonseed oil, and soybean oil for example.

Example 2

Examples of Food Compositions Incorporating Stabilized Enriching Oils

The following example recipes illustrate additional foods incorporating omega-3 supplementation oils. Composition percentages are given as weight percentages. As will be readily understood, many variants of these foods can also be made by varying the ingredient list and/or ingredient amounts.

Mayonnaise (Serving Size 15 g)

| Ingredients | Percent (%) |
| --- | --- |
| Water | 52.6008 |
| High Oleic (HO) Sunflower Oil | 30.215 |
| -Omega-3 Oil | 0.2133 |
| Starch | 5.0221 |
| Vinegar | 5.4866 |
| Salt | 1.1752 |
| Sugar | 2.4106 |
| Whey Protein Concentrate | 2.0000 |
| Mustard Flour | 0.5173 |
| Sodium Benzoate | 0.0854 |
| Potassium Sorbate | 0.0854 |
| Xanthan Gum | 00753 |
| Beta Carotene | 0.0251 |
| Celery Salt | 0.0412 |
| Citric Acid | 0.0251 |
| Vitamin E | 0.0141 |
| EDTA | 0.0075 |
| Total | 100.0000 |

Salad Dressing—Creamy Italian (Serving Size 80 g)

| Ingredients | Percent (%) |
| --- | --- |
| Water | 36.8043 |
| HO Sunflower Oil | 29.6223 |
| -Omega-3 Oil | 0.0400 |
| Vinegar | 12.4965 |

-continued

| Ingredients | Percent (%) |
|---|---|
| Sugar | 9.6317 |
| Starch | 5.0705 |
| Egg Yolks, 10% salt | 4.0235 |
| Salt | 0.9274 |
| Minced Onion | 0.6064 |
| Garlic Powder | 0.4994 |
| Potassium Powder | 0.0852 |
| Peppers | 0.1284 |
| Oregano | 0.0571 |
| Calcium Disodium EDTA | 0.0073 |
| Total | 100.0000 |

Cheese Sauce (Macaroni and Cheese) Serving Size 100 g

| Ingredients | Percent (%) |
|---|---|
| Milk | 69.04 |
| Cheddar Cheese | 24.36 |
| HO Sunflower Oil | 2.97 |
| -Omega-3 Oil | 0.03 |
| Starch | 2.40 |
| Salt | 1.00 |
| Lecithin | 0.20 |
| Total | 100.00 |

Sour Cream—(Serving size 30 g)

| Ingredients | Percent (%) |
|---|---|
| Whole Milk | 70.0000 |
| Heavy Cream | 16.0000 |
| Skim Milk | 5.0000 |
| Non-Fat Dry Milk | 4.0000 |
| Starch | 2.2200 |
| Lactic Acid | 1.0000 |
| HO Sunflower Oil | 0.4433 |
| -Omega-3 Oil | 0.1067 |
| Guar Gum | 0.3500 |
| Salt | 0.3000 |
| Sodium Tripolyphosphate | 0.2500 |
| Locust Bean Gum | 0.2500 |
| Sodium Citrate | 0.0800 |
| Total | 100.0000 |

Yogurt (Serving Size 225 g)

| Ingredients | Percent (%) |
|---|---|
| Water | 80.2900 |
| Protein | 7.4100 |
| Sugar | 5.5000 |
| Fructose | 2.0000 |
| Stabilizer | 2.2500 |
| HO Sunflower Oil | 1.2358 |
| -Omega-3 Oil | 0.0142 |
| Dextrose | 1.0000 |
| Natural Masking Flavor | 0.3000 |
| Total | 100.0000 |

Other Exemplary Products for Inclusion of Omega-3 Supplementation Oils:
Cream Cheese—Low Fat/Regular
½ & ½ Creamers
Ice Cream—Low Fat
Smoothie
Cheese
Dips
Sauces
Gravy
Batters and dough Example 3

Flavor Stability of Skim Milk Containing Fish Oil Diluted with Different Stabilizing Oils and Fats and Emulsified into Skim Milk In the first of a series of stability tests, high oleic sunflower oil, palm oil stearin, and several different sources of palm kernel stearin were each evaluated for their ability to stabilize the flavor of freshly refined menhaden fish oil dispersed in skim milk fortified with non-fat dry milk (yielding a final protein level in the milk of 4.2% by weight). Menhaden fish oil that had been isolated and refined by Omega Protein, Inc. (Houston, Tex.) was supplemented with an antioxidant composition containing mixed tocopherols, rosemary extract, ascorbyl palmitate and lecithin. The resulting fish oil (termed "OP HSN") was diluted with 5 parts by weight of either a stabilizing oil or an Oxidative Stabilization Fat. These included a high oleic sunflower oil (Odyssey 100 from Cargill, Inc., Minneapolis, Minn.) or alternatively a number of different saturated fats. The latter included both a palm oil stearin (CEBES 29-02 from AahrusKarlshamn USA, Edison, N.J.) and several palm kernel stearins that are solid at room temperature (CEBES 21-20 from AahrusKarlshamn USA, Edison, N.J.; Palkena S from Fuji Vegetable Oil, Inc., Savannah, Ga.; and CLSP449 from Loders Croklaan, Channahon, Ill.). The sunflower-fish oil blend and the palm fat-fish oil blends were dispersed with high shear mixing (Turrax blender at 4000 rpm) at room temperature and at 40° C. respectively into skim milk fortified with sufficient non-fat dry milk (NFDM) to produce a total protein level of 4.2% by weight protein. With the final level of added fat blend in the milks equal to 0.35% by weight (865 mg/247 g serving), the milks contained approximately 144 mg fish oil with 32 mg DHA/EPA per serving. Milks were pasteurized at 162° F. for 15 sec and homogenized at 2500 PSI. Milk containers were filled at 50° F. and stored refrigerated at 40° F. Refrigerated samples were evaluated by a taste panel for off-flavor development over time with a value of 10 being assigned for excellent flavor and 1 being a strongly disagreeable flavor. After 6 days of storage, the samples showed compromised flavor. The flavor scoring for high oleic sunflower oil, palm kernel stearin (average of 3 samples) and palm oil stearin were 6.4, 7.1 and 8.0 respectively. These values suggest that a modest improvement in flavor stability is obtained with substituting palm stearins for high oleic sunflower oil.

There are at least two possible explanations for the improved flavor stability over time for fish oil (and/or other sources of omega-3 fatty acids) diluted into a saturated stearin-based Oxidative Stabilization Fat compared to a high oleic sunflower oil (abbreviated "HOSO"), after these fat blends have been dispersed as microdroplets into milk. Applicant has observed that the stearins combined with fish oil produce solid fat microparticles while the HOSO produces liquid microdroplets at a typical storage temperature of 40° F. It is possible that reduced molecular mobility and less frequent fatty acid molecular contacts or collisions involving free radical species that may occur in solid fat microparticles compared to liquid oil may reduce oxidation and development of off-flavors in liquid oil microdroplets. Reduced chemical diffusion rates within solid fat microparticles (compared to liquid oil) might also reduce the rate of release of off-flavor by-products into the surrounding milk. Furthermore, HOSO with its 82% content of monounsaturated oleic acid, may not provide as chemically inert an environment with respect to singlet electron transfer among molecules (free radical oxidation) as the stearins that typically contain 80-90% saturated fatty acids and only 10-15% oleic acid. One or more of these factors may be responsible for better performance of stearins compared to HOSO.

Example 4

Comparative OSI Measurements for Stabilizing Oils and Fats

One of the factors that may contribute to the unusual oxidative stability of fish oil diluted into a stearin fat (an Oxidative Stabilization Fat) is a decreased susceptibility to peroxidation of omega-3 fatty acids in the presence of saturated fatty acids versus monounsaturated fatty acids. To examine this question, the same oil and fat blends described above (containing 1 part by weight fish oil and 5 parts by weight stabilization oil or fat) were compared by measuring their oxidative stability indices (OSIs) at an elevated temperature, at which all of the fat and oil blends were liquid. OSI measurements (hours to oxidative induction) were carried out using an incubation temperature of 100° C. In brief, the OSI value is determined by heating an oil at constant temperature with a stream of air passing through the oil. The air is passed through a volume of water that captures volatile oxidative by-products, some of which are electrically conductive. After a characteristic induction period during which the conductivity rises slowly, the conductivity thereafter rises rapidly. The inflection point (OSI value in hours) is determined from the plotted curve of conductivity versus time.

OSI values (hrs) were as follows for the same fish oil and sunflower oil, palm kernel stearin and palm oil stearin blends tested as described above for flavor stability: fish oil alone, 15 hrs (control); fish oil diluted 6-fold with high oleic sunflower oil, 58 hrs; fish oil diluted 6-fold with three different palm kernel stearin sources, 88 hrs, 82 hrs and 73 hrs; and fish oil diluted 6-fold with palm oil stearin, 85 hrs. Thus, the dilution of fish oil into high oleic sunflower oil increased the OSI by 58-15 hrs=43 hrs whereas dilution of fish oil into four different palm stearins increased the OSI an average of 82-15 hrs=67 hrs. Thus, the palm stearins used for diluting fish oil provided a very substantial 50% greater increase in OSI value over high oleic sunflower oil (67 hrs vs. 43 hrs). The 5- or 6-fold OSI increase from 15 hrs for fish oil alone to 82 hours for fish oil diluted with palm stearins is remarkable.

It is interesting and worth noting that with the flavor stability tests of refrigerated milk described above, palm stearin+fish oil fat blends remained solid while sunflower oil+fish oil blends remained liquid in the milk. However, when the same fat blends were heated at 100° C. and OSI-tested, they were clearly all oxidatively stressed as liquid oils. Accordingly, based on the OSI numbers as well as the flavor stability tests, it is proposed that a triglyceride chemical environment rich in saturated fatty acids is chemically more inert than a monounsaturated fatty acid-rich environment with regard to stabilizing omega-3 fatty acids against peroxidation. In the present examples, the saturated fat included approximately 70%-80% palmitic acid or lauric+myristic acids for the palm oil and palm kernel stearins respectively, whereas the monounsaturated oil included approximately 82% oleic acid and 10% palmitic+stearic acids. This proposed explanation for fish oil stabilization does not diminish the likely importance of a saturated fat in stabilizing omega-3 EPA and DHA via formation of a solid phase (e.g., enabling formation of solid Omega Supplementation Fat Blend microparticles) in which the mobility of pro-oxidant free radical molecular species is diminished.

Example 5

OSI Measurements for Fish Oil Diluted with Palm Fat, Milkfat or High Oleic Sunflower Oil As in the above Examples, the same menhaden fish oil (abbreviated "FO") prepared by Omega Protein, Inc. was diluted 6-fold by weight into either (A) high oleic sunflower oil (abbreviated "HOSO") from Cargill, Inc. or (B) palm oil stearin (abbreviated "POS", CISAO® 82-53 brand from AarhusKarlshamn Inc. or (C) anhydrous milkfat (abbreviated "AMF") and subjected to the same OSI measurement. Each diluent fat was OSI-tested alone, supplemented with an antioxidant mixture (+AO), or combined with the fish oil (+FO) and either unsupplemented (−AO) or supplemented (+AO) with the same fat-soluble water-insoluble antioxidant mixture to a final concentration of 0.05% by weight mixed tocopherols, 1.45% rosemary extract, 0.1% ascorbyl palmitate and 0.5% lecithin. The tabulated measurements that follow demonstrate that palm oil stearin and anhydrous milkfat are nearly twice as stable (based on OSI measurements) as high oleic sunflower oil when supplemented with antioxidants, and can increase the oxidative stability of fish oil diluted 6-fold into these antioxidant-supplemented fats almost 100% compared to high oleic sunflower oil. Numerical values are parts by weight of oil or fat in blends, e.g., 1 part by weight FO combined with 5 parts by weight oxidative stabilization fat.

| Fat or Fat Blend | OSI (hrs at 100° C.) |
| --- | --- |
| HOSO + AO | 148 |
| POS + AO | 260 |
| AMF + AO | 281 |
| 5 HOSO + 1 FO (−AO) | 38 |
| 5 POS + 1 FO (−AO) | 59 |
| 5 AMF + 1 FO (−AO) | 52 |
| 5 HOSO + 1 FO (+AO) | 58 |
| 5 POS + 1 FO (+AO) | 112 |
| 5 AMF + 1 FO (+AO) | 115 |

Example 6

Flavor Stability of Skim Milk Containing Fish Oil Diluted with Sunflower Oil, Milkfat or Palm Oil Stearin Stored Under Fluorescent Lighting In the second of a series of flavor stability tests, high oleic sunflower oil (abbreviated "HOSO", see above from Cargill, Inc.), anhydrous milkfat (AMF) and a palm oil stearin+olein blend obtained from Loders Crooklan, Channahon, Ill. (SansTrans™39 product abbreviated "POSO" with a melting point of 37-41° C.), were each evaluated for their ability to stabilize the flavor of menhaden fish oil dispersed in skim milk. Skim milk was fortified with sufficient non-fat dry milk to produce a final protein level in the milk of 4.2% by weight. Menhaden fish oil that had been isolated and refined by Omega Protein, Inc. (Houston, Tex.) as well as the HOSO oil and the AMF and POSO fats were supplemented with the same antioxidant levels of mixed tocopherols, rosemary extract, ascorbyl palmitate and lecithin described above. Fish oil was diluted with either 5 parts by weight of the HOSO or 2 parts by weight of AMF or 2 parts by weight POSO. The first of these blends containing fish oil diluted with liquid HOSO (500 mg HOSO+100 mg fish oil providing 32 mg EPA+DHA per 8 fl oz serving of milk) was dispersed directly into the skim milk using high shear mixing (Turrax blender at 4000 rpm). The other two skim milk preparations required preparation of aqueous pre-emulsions in which 2 parts of the solid fats, POSO or AMF were melted and combined with 1 part of fish oil to form melted fat blends. The aqueous pre-emulsions contained 30% by weight of these melted fat blends and 70% by weight of a water phase. The water phase contained sodium caseinate adequate for stabilizing the emulsion, and the fat blends were supplemented with an adequate level of a mono- and diglyceride DATEM derivative (Panodan® S Visco-Lo 2000, a diacetyl tartaric acid ester derivative obtained from Danisco USA, New Century, Kans.) that also assisted in stabilizing the aqueous emulsions. These emulsions were added to the skim milk with medium shear agitation, in amounts sufficient for providing 32 mg EPA+DHA per 8 oz serving of milk. Milks were pasteurized at 280° F. for 3 sec, homogenized at 2000+500 PSI, and stored refrigerated at 40° F. in both 12 oz white PETE plastic bottles and also in transparent bottles. These bottles were then stored either in the dark or under cool white fluorescent lighting. Sensory testing of these milks was performed over 15 days of storage. None of the sample milks packaged in white PETE bottles developed a fishy flavor over this period regardless of exposure to light, although all samples stored in the dark were reported to have a cleaner, fresher taste. However, with milk samples stored in transparent bottles, fluorescent light exposure resulted in fishy off-flavors developing in all of the fish oil-fortified milk samples. More specifically, off-flavors were first detected on day 8 for milk containing fish oil that had been diluted 6-fold with HOSO. Subsequently, off-flavors were detected on day 11 for fish oil diluted only 3-fold with AMF, and finally on day 13 for fish oil diluted only 3-fold with POSO. Therefore, AMF and POSO fats were surprisingly more effective even when used at a lower level than HOSO oil for stabilizing fish oil against photo-oxidation by fluorescent lighting (11 and 13 days stability compared to 8 days). Taking into consideration that the fish oil was combined at twice the concentration (@ 33% by weight) with the AMF and POSO Oxidative Stabilization Fats compared to the HOSO oil (@ 17% by weight), these saturated fats are even more effective at extending shelf life (compared to HOSO) than the sensory tests indicate. These stability findings suggest that the abundance of saturated fatty acids as well as the solid nature of the AMF and POSO fat microparticles (under refrigeration) improve the stabilization of fish oil.

Example 7

Flavor Stability of Skim Milk Containing Equivalent Dilutions of Fish Oil in Sunflower Oil, Milkfat and Palm Oil Stored Under Fluorescent Lighting The flavor stability experiment of Example 6 was repeated with several modifications in protocol as follows: All bottles used for packaging the milk samples were transparent to allow more rapid photo-oxidation to occur. Duplicate bottled samples were stored refrigerated under continuous fluorescent lighting and also in the dark. All three carrier oils and fats (HOSO, POSO, and AMF) were combined with equal amounts of menhaden fish oil (1:1 weight ratios) to produce three different fish oil blends. The fish oil component (and not the carrier oil/fat) contained the fat-soluble water-insoluble antioxidant recipe described above. The oil and melted fat blends were converted to concentrated oil/fat-in-water emulsions as described above before dilution into skim milk fortified with non-fat dry milk to provide a final protein level of 4.2% by weight. Milks were homogenized at 2000+500 PSI and pasteurized at 290° C. for 3 seconds. Total amount of EPA+DHA added to the milks was 32 mg per 240 ml serving. Sensory comparisons were made on days 1, 4, 5, 6, 7, 8, 11, 14, 18, 21, 25, 34, and 46. Refrigerated milk samples exposed to continuous fluorescent lighting exhibited fishy off-flavors long before refrigerateds milks stored in the dark. More specifically, off-flavors were detected on day 6 with the blend of HOSO+fish oil exposed to light, then on day 8 for the POSO blend exposed to light, and finally on day 11 for the AMF blend exposed to light. Therefore, almost twice the flavor stability (measured in days) was afforded by AMF compared to HOSO under fluorescent lighting (11 days compared to 6 days). For the same milks stored refrigerated in the dark, the blend of HOSO+fish oil exhibited a slight fishy off-flavor on day 25, followed by the blend of AMF+fish oil on day 34. By the end of testing on day 46, the blend of POSO+fish oil stored in the dark had not developed any off-flavor. The results of these tests again confirm that AMF and POSO fats provide better stabilization and resistance of fish oil to photo-oxidation than high oleic sunflower oil (HOSO).

Example 8

Flavor Stability of Skim Milk Containing Fish Oil Diluted with Increasing Amounts Of Milkfat or Sunflower Oil Stored Under Fluorescent Lighting The flavor stability experiment of Example 7 was repeated with several modifications. All skim milks were fortified with fish oil and were packaged in 8 oz transparent sterile bottles that were stored refrigerated. One part by weight fish oil was diluted with 1, 2, 3 and 4 parts by weight of anhydrous milkfat (AMF) or with 2 and 4 parts by weight of high oleic sunflower oil (HOSO) before being made into oil-in-water emulsions with a laboratory homogenizer as described in Example 6 for addition to protein-enriched skim milk. The composition, homogenization and pasteurization of the skim milk was the same as described in Example 6. Total amount of EPA+DHA added to each milk sample was 32 mg per 8 oz serving. Sensory evaluation of the skim milks stored at 40° C. and under constant exposure to fluorescent lighting continued until all samples developed an undesirable fishy off flavor. In addition, the oxidative stabiities of all of the fish oil+AMF and HOSO blends prepared in this experiment and emulsified for addition to milk were separately OSI-tested at 100° C. Sensory results were as follows: Milks containing 1 part fish oil diluted with 2 parts and 4 parts by weight HOSO developed a fishy off flavor detected by the majority of taste panel members after 6 days of refrigeration and fluorescent light exposure. Addition of supplemental antioxidant to the HOSO only marginally increased this shelf life (to about 8 days). On the other hand, milks with 1 part fish oil diluted with 1 part and 2 parts by weight AMF did not show a fishy off flavor until after 10 days of refrigeration and light exposure. With milks containing 3 and 4 parts AMF to 1 part fish oil, off flavors were not detected until 13 days, or approximately twice the time for off flavor development when HOSO rather than AMF was used to stabilize the fish oil.

OSI measurements were obtained at 100° C. for the above-described oil and fat blends (without supplementary antioxidants). In addition, portions of the same HOSO and AMF used for diluting and stabilizing the fish oil were supplemented with the same mixture and concentration of fat-soluble water-insoluble antioxidants present in the fish oil (see Example 5). The symbol (+/−) refers to the presence or absence of supplementary antioxidant in the fat/oil diluent, while Dilution refers to the weight ratio of oil or fat diluent to menhaden fish oil.

| Diluent, Antioxidant (+/−) | Dilution | OSI at 100° C. (hours) |
|---|---|---|
| HOSO (+) | 1:1 | 60 |
| AMF (−) | 1:1 | 25 |
| AMF (+) | 1:1 | 58 |
| HOSO (−) | 2:1 | 24 |
| HOSO (+) | 2:1 | 67 |
| AMF (−) | 2:1 | 32 |
| AMF (+) | 2:1 | 92 |
| HOSO (+) | 3:1 | 76 |
| AMF (−) | 3:1 | 38 |
| AMF (+) | 3:1 | 100 |
| HOSO (−) | 4:1 | 32 |
| HOSO (+) | 4:1 | 90 |
| AMF (−) | 4:1 | 46 |
| AMF (+) | 4:1 | 118 |

The OSI results show that for a given dilution of fish oil and a given fat or oil diluent, the addition of supplementary antioxidant to the fat or oil can very substantially increase the OSI value (an average of approximately 2.5-fold). Furthermore, for a given dilution of fish oil above a 1:1 ratio, without changing antioxidant (+/−) status, the substitution of anhydrous milkfat for high oleic sunflower oil (AMF for HOSO) results in an OSI value increase of approximately 30-40%. Therefore, optimizing both the level of antioxidant and the choice of diluent fat can play major roles in stabilizing fish oil against air and heat-related oxidation and photo-oxidation. Air and heat oxidation is reflected in the OSI test measurements while photo-oxidation is monitored by refrigerated storage under fluorescent lighting conditions (with sensory testing).

All patents and other references cited in the specification are indicative of the level of skill of those skilled in the art and are incorporated by reference in their entireties, including any tables and figures, to the same extent as if each reference had been incorporated by reference in its entirety individually.

One skilled in the art would readily appreciate that the work described herein is well adapted to obtain the ends and advantages mentioned, as well as those inherent therein. The methods, variances, and compositions described herein as presently representative of preferred embodiments are exemplary and are not intended as limitations.

It will be readily apparent to one skilled in the art that varying substitutions and modifications may be made without departing from the scope and spirit of the invention. For example, variations can be made in the particular choice of oxidative stabilization oil, source of EPA/DHA or alpha-linolenic fatty acid-containing enriching oils, method of combining and diluting edible oils, method of homogenizing and/or pasteurizing milk, method of measuring and reporting the fat content of milk, method of measuring the rate of oxidation of omega-3 fatty acids in milk and the like. Such additional embodiments are within the scope of the present invention and the following claims.

The methods and compositions described herein suitably may be practiced in the absence of any element or elements, limitation or limitations which is not specifically disclosed herein. Thus, for example, in each instance herein any of the terms "comprising", "consisting essentially of" and "consisting of" may be replaced with either of the other two terms. The terms and expressions which have been employed are used as terms of description and not of limitation, and there is no intention in the use of such terms and expressions to exclude any equivalents of the features shown and described or portions thereof, but it is recognized that various modifications are possible. Thus, it should be understood that although the disclosure has been made with reference to preferred embodiments and optional features, modification and variation of the concepts herein disclosed may be resorted to by those skilled in the art, and that such modifications and variations are considered to be within the scope of the appended claims.

In addition, where features or aspects are described in terms of Markush groups or other grouping of alternatives, those skilled in the art will recognize that they are also thereby described in terms of any individual member or subgroup of members of the Markush group or other group.

Also, unless indicated to the contrary, where various numerical values or value range endpoints are provided for embodiments, additional embodiments are described by taking any 2 different values as the endpoints of a range or by taking two different range endpoints from specified ranges as the endpoints of an additional range. Such ranges are also within the scope of the described invention. Further, specification of a numerical range including values greater than one includes specific description of each integer value within that range.

Thus, additional embodiments are within the scope of the disclosure and the following claims.

What is claimed is:

1. A cow's milk beverage product made by supplementing cow's milk with an Omega Supplementation Fat Blend to provide at least 10 mg of omega-3 fatty acids per 250 g serving of said beverage product, wherein the Omega Supplementation Fat Blend comprises:
   (a) one part by weight of an Enriching Oil containing an omega-3 fatty acid selected from the group consisting of docosahexaenoic acid (DHA); eicosapentaenoic acid (EPA); alpha-linolenic acid (ALA); a combination of DHA and EPA; a combination of DHA and ALA; a combination of EPA and ALA; and a combination of DHA, EPA and ALA;
   (b) between one-half part and 20 parts by weight of an Oxidative Stabilization Fat containing less than 20% by weight of linoleic acid; and
   (c) at least one fat soluble antioxidant;
wherein said Omega Supplementation Fat Blend is formed by mixing to uniformity said Enriching Oil with said Oxidative Stabilization Fat prior to supplementation of said cow's milk; and wherein said Omega Supplementation Fat Blend comprises said at least one fat soluble antioxidant and at least about 30% by weight of a saturated fatty acid or a combination of saturated fatty acids.

2. The cow's milk beverage product of claim 1, comprising approximately 100 mg of fish oil per 250 g serving of said beverage product.

3. The cow's milk beverage product of claim 1, comprising approximately 32 mg of EPA+DHA per 250 g serving of said beverage product.

4. The cow's milk beverage product of claim 1, wherein said Omega Supplementation Fat Blend comprises at least about 40% by weight of a saturated fatty acid or a combination of saturated fatty acids.

5. The cow's milk beverage product of claim 1, wherein said Omega Supplementation Fat Blend comprises at least about 40% by weight of a combination of lauric, myristic, palmitic, and stearic saturated fatty acids.

6. An Omega Supplementation Fat Blend, comprising a uniform blend of:
   (a) one part by weight of an Enriching Oil containing docosahexaenoic acid (DHA); eicosapentaenoic acid (EPA); alpha-linolenic acid (ALA); a combination of DHA and EPA; a combination of DHA and ALA; a combination of EPA and ALA; or a combination of DHA, EPA and ALA;
   (b) between one-half part and 20 parts by weight of an Oxidative Stabilization Fat containing less than 20% by weight of linoleic acid;
wherein said Omega Supplementation Fat Blend comprises at least about 30% by weight of a saturated fatty acid or a combination of saturated fatty acids; and
   (c) at least one fat soluble antioxidant.

7. The Omega Supplementation Fat Blend of claim 6, wherein the ratio of Oxidative Stabilization Fat to Enriching Oil is from about 5:1 to about 0.5:1 by weight.

8. The Omega Supplementation Fat Blend of claim 6, wherein the Enriching Oil comprises between about 20% and about 60% of docosahexaenoic acid (DHA); eicosapentaenoic acid (EPA); alpha-linolenic acid (ALA); a combination of DHA and EPA; a combination of DHA and ALA; a combination of EPA and ALA; or a combination of DHA, EPA and ALA.

9. The Omega Supplementation Fat Blend of claim 6, wherein the Enriching Oil is fish oil.

10. The Omega Supplementation Fat Blend of claim 6, wherein the Enriching Oil is selected from the group consisting of fish oil, algae oil, flaxseed oil and combinations thereof.

11. The Omega Supplementation Fat Blend of claim 6, wherein the Oxidative Stabilization Fat contains at least about 40% by weight saturated fatty acids.

12. The Omega Supplementation Fat Blend of claim 6 that comprises at least about 40% by weight of a saturated fatty acid or a combination of saturated fatty acids.

13. A food or a beverage supplemented with the Omega Supplementation Fat Blend of claim 6.

14. The food or a beverage of claim 13, that provides at least 10 mg of docosahexaenoic acid (DHA); at least 10 mg of eicosapentaenoic acid (EPA); at least 10 mg of alpha-linoleic acid (ALA); at least 10 mg of a combination of DHA and EPA; at least 10 mg of a combination of DHA and ALA; at least 10 mg of a combination of EPA and ALA; or at least 10 mg of a combination of DHA, EPA and ALA per normal serving of the food or beverage.

15. The food or beverage of claim 14, wherein the food or beverage comprises cream, hard cheese, cottage cheese, cream cheese, processed cheese, natural cheese, cheese sauce, sour cream, yogurt, coffee creamer, ice cream, a refrigerated or non-refrigerated dip, salad dressing, mayonnaise, a smoothie beverage, a processed egg, an egg substitute, buttermilk, ice cream, a mixed dairy beverage, or butter.

16. The food or beverage of claim 13, wherein the Omega Supplementation Fat Blend is solid at the storage temperature of the food or beverage.

17. A method of making a stabilized aqueous suspension, comprising:
   (a) blending one part by weight of an Enriching Oil with between one-half part and 20 parts by weight of a liquid Oxidative Stabilization Fat, thereby forming an Omega Supplementation Fat Blend; wherein the Enriching Oil contains docosahexaenoic acid (DHA); eicosapentaenoic acid (EPA); alpha linolenic acid (ALA); a combination of DHA and EPA; a combination of DHA and ALA; a combination of EPA and ALA; or a combination of DHA, EPA and ALA; wherein the Oxidative Stabilization Fat contains less than 20% by weight of linoleic acid; wherein said Omega Supplementation Fat Blend comprises at least about 30% by weight of a saturated fatty acid or a combination of saturated fatty acids and comprises at least one fat soluble antioxidant; and
   (b) homogenizing the Omega Supplementation Fat Blend formed in (a) with an aqueous suspension, thereby forming the stabilized aqueous suspension;
wherein a sufficient amount of the Supplementation Fat Blend is homogenized in (b) with the aqueous suspension to provide at least 10 mg of docosahexaenoic acid (DHA); eicosapentaenoic acid (EPA); alpha-linoleic acid (ALA); a combination of DHA and EPA; a combination of DHA and ALA; a combination of EPA and ALA; or a combination of DHA, EPA and ALA per normal serving of the stabilized aqueous suspension.

18. The method of claim 17, wherein said Omega Supplementation Fat Blend comprises at least about 40% by weight of a saturated fatty acid or a combination of saturated fatty acids.

19. The method of claim 17, wherein said Omega Supplementation Fat Blend comprises at least about 30% by weight of a combination of lauric, myristic, palmitic, and stearic saturated fatty acids.

20. The method of claim 19, wherein said Omega Supplementation Fat Blend comprises at least about 40% by weight of a combination of lauric, myristic, palmitic, and stearic saturated fatty acids.

21. A cow's milk beverage product made by supplementing cow's milk with an Omega Supplementation Fat Blend to provide at least 10 mg of omega-3 fatty acids per 250 g serving of said beverage product, wherein the Omega Supplementation Fat Blend comprises:
   (a) one part by weight of an Enriching Oil containing an omega-3 fatty acid selected from the group consisting of docosahexaenoic acid (DHA); eicosapentaenoic acid (EPA); alpha-linolenic acid (ALA); a combination of DHA and EPA; a combination of DHA and ALA; a combination of EPA and ALA; and a combination of DHA, EPA and ALA; and
   (b) between one-half part and 20 parts by weight of an Oxidative Stabilization Fat containing less than 20% by weight of linoleic acid;
wherein said Omega Supplementation Fat Blend is formed by mixing to uniformity said Enriching Oil with said Oxidative Stabilization Fat prior to supplementation of said cow's milk; and wherein said Omega Supplementation Fat Blend comprises at least about 30% by weight of a saturated fatty acid or a combination of saturated fatty acids and contains no more than 11% by weight of linoleic acid.

22. The cow's milk beverage product of claim 21, wherein said Omega Supplementation Fat Blend contains no more than 9% by weight of linoleic acid.

23. The cow's milk beverage product of claim 21, wherein the Oxidative Stabilization Fat is selected from the group consisting of milkfat, palm oil, palm kernel oil, palm olein, coconut oil, cocoa butter, and combinations thereof.

24. The cow's milk beverage product of claim 23, wherein the Oxidative Stabilization Fat is milkfat.

25. An Omega Supplementation Fat Blend, comprising a uniform blend of:
   (a) one part by weight of an Enriching Oil containing docosahexaenoic acid (DHA); eicosapentaenoic acid (EPA); alpha-linolenic acid (ALA); a combination of DHA and EPA; a combination of DHA and ALA; a combination of EPA and ALA; or a combination of DHA, EPA and ALA; and (b) between one-half part and 20 parts by weight of an Oxidative Stabilization Fat containing less than 20% by weight of linoleic acid;

wherein said Omega Supplementation Fat Blend comprises at least about 30% by weight of a saturated fatty acid or a combination of saturated fatty acids and contains no more than 11% by weight of linoleic acid.

26. The Omega Supplementation Fat Blend of claim 25 that contains no more than 9% by weight of linoleic acid.

27. The Omega Supplementation Fat Blend of claim 25, wherein the Oxidative Stabilization Fat is selected from the group consisting of milkfat, palm oil, palm kernel oil, palm olein, coconut oil, cocoa butter, and combinations thereof.

28. The Omega Supplementation Fat Blend of claim 25, wherein the Oxidative Stabilization Fat is milkfat.

29. A food or a beverage supplemented with the Omega Supplementation Fat Blend of claim 25.

30. A method of making a stabilized aqueous suspension, comprising:

(a) blending one part by weight of an Enriching Oil with between one-half part and 20 parts by weight of a liquid Oxidative Stabilization Fat, thereby forming an Omega Supplementation Fat Blend; wherein the Enriching Oil contains docosahexaenoic acid (DHA); eicosapentaenoic acid (EPA); alpha linolenic acid (ALA); a combination of DHA and EPA; a combination of DHA and ALA; a combination of EPA and ALA; or a combination of DHA, EPA and ALA; wherein the Oxidative Stabilization Fat contains less than 20% by weight of linoleic acid; wherein said Omega Supplementation Fat Blend comprises at least about 30% by weight of a saturated fatty acid or a combination of saturated fatty acids and contains no more than 11% by weight of linoleic acid; and (b) homogenizing the Omega Supplementation Fat Blend formed in (a) with an aqueous suspension, thereby forming the stabilized aqueous suspension;

wherein a sufficient amount of the Supplementation Fat Blend is homogenized in (b) with the aqueous suspension to provide at least 10 mg of docosahexaenoic acid (DHA); eicosapentaenoic acid (EPA); alpha-linoleic acid (ALA); a combination of DHA and EPA; a combination of DHA and ALA; a combination of EPA and ALA; or a combination of DHA, EPA and ALA per normal serving of the stabilized aqueous suspension.

31. The method of making a stabilized aqueous suspension of claim 30, wherein said Omega Supplementation Fat Blend contains no more than 9% linoleic acid by weight.

32. The cow's milk beverage product of claim 21, wherein said Oxidative Stabilization Fat is selected from the group consisting of palm oil, palm kernel oil, palm olein, coconut oil, cocoa butter, and combinations thereof.

33. An Omega Supplementation Fat Blend, comprising a uniform blend of:

(a) one part by weight of an Enriching Oil containing docosahexaenoic acid (DHA); eicosapentaenoic acid (EPA); alpha-linolenic acid (ALA); a combination of DHA and EPA; a combination of DHA and ALA; a combination of EPA and ALA; or a combination of DHA, EPA and ALA; and (b) between one-half part and 20 parts by weight of an Oxidative Stabilization Fat that is a vegetable fat and contains less than 20% by weight of linoleic acid;

wherein said Omega Supplementation Fat Blend comprises at least about 30% by weight of a saturated fatty acid or a combination of saturated fatty acids.

34. The Omega Supplementation Fat Blend of claim 33, wherein said Oxidative Stabilization Fat is selected from the group consisting of palm oil, palm kernel oil, palm olein, coconut oil, cocoa butter, and combinations thereof.

* * * * *